(12) United States Patent
Konno et al.

(10) Patent No.: US 7,280,577 B2
(45) Date of Patent: Oct. 9, 2007

(54) PUMPING METHOD FOR LASER EQUIPMENT

(75) Inventors: Susumu Konno, Tokyo (JP); Tetsuo Kojima, Tokyo (JP); Shuichi Fujikawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 348 days.

(21) Appl. No.: 10/475,918

(22) PCT Filed: Apr. 24, 2002

(86) PCT No.: PCT/JP02/04091

§ 371 (c)(1),
(2), (4) Date: Apr. 15, 2004

(87) PCT Pub. No.: WO02/091533

PCT Pub. Date: Nov. 14, 2002

(65) Prior Publication Data

US 2004/0170205 A1   Sep. 2, 2004

(30) Foreign Application Priority Data

May 7, 2001   (JP) .............................. 2001-136345

(51) Int. Cl.
*H01S 3/14*   (2006.01)
(52) U.S. Cl. .......................................... 372/68; 372/39
(58) Field of Classification Search ................ 372/39, 372/68, 69
See application file for complete search history.

(56) References Cited

U.S. PATENT DOCUMENTS

| 3,258,717 | A | * | 6/1966 | Katzman ..................... 372/14 |
| 5,093,838 | A |   | 3/1992 | Kubota |
| 5,412,683 | A |   | 5/1995 | Nighan, Jr. et al. |
| 5,500,866 | A |   | 3/1996 | Goethals |
| 5,892,789 | A |   | 4/1999 | Yasui et al. |

FOREIGN PATENT DOCUMENTS

| JP | 06-224524 | * | 8/1994 |
| JP | 08-250797 | * | 9/1996 |
| JP | 08-306997 | * | 11/1996 |
| JP | 2001-007427 | * | 1/2001 |
| JP | 2001-094177 |   | 4/2001 |
| JP | 2001-127360 | * | 5/2001 |
| JP | 2002-050813 |   | 2/2002 |

OTHER PUBLICATIONS

A. Takada et al., "Highly efficient operation of diode laser transversely pumped high-power Nd:YAG rod laser," *Proceedings of SPIE*, 2000, pp. 216-223, vol. 3889.

* cited by examiner

*Primary Examiner*—Armando Rodriguez
(74) *Attorney, Agent, or Firm*—Leydig, Voit & Mayer, Ltd.

(57) ABSTRACT

Laser equipment in which pumping every dependence of output beam diameter and beam wavefront curvature is reduced. The total pumping energy of at least one of laser active media disposed beyond terminal laser beam waists, among beam waists, is approximately one-half of the total pumping energy of laser active media disposed between two adjacent beam waists.

6 Claims, 19 Drawing Sheets

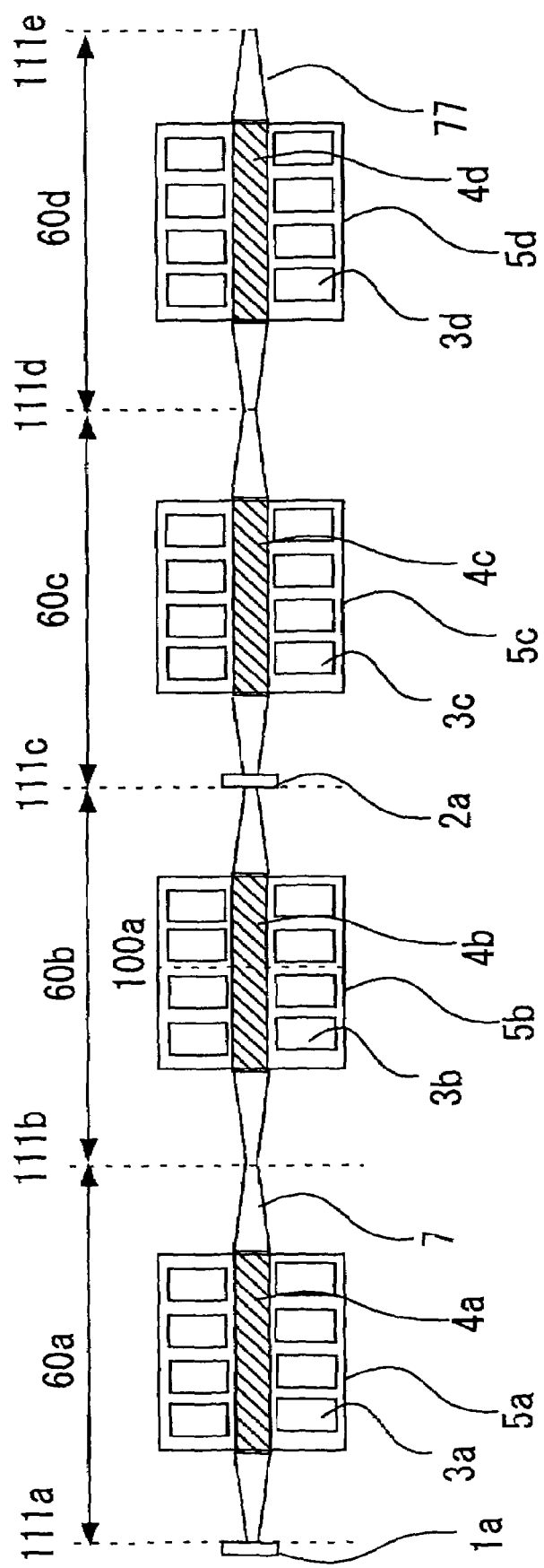

PUMPING METHOD FOR LASER EQUIPMENT

TECHNICAL FIELD

The present invention relates to diminishing of variation in laser beam parameters that depend on changes in pumping energy, in laser equipment and laser machining devices that include laser active media, the optical properties of which change depending on changes in the pumping energy.

BACKGROUND ART

FIG. 26 is a block diagram for explaining conventional laser equipment disclosed in "Highly efficient operation of diode laser transversely pumped high power Nd:YAG rod laser" by A. Takada et al., Advanced High-Power Lasers, Proceedings of SPIE, Vol. 3889.

In FIG. 26, $1a$ is a totally reflecting mirror with plane curvature, and $2a$ is a partially transmitting mirror with plane curvature. $5a$, $5b$, $5c$ and $5d$, referred to as laser pumping sections hereinafter, are fundamental devices that singly or plurally constitute laser oscillators or laser amplifiers, and include respective laser active media $4a$, $4b$, $4c$ and $4d$, and respective laser active medium pumping devices $3a$, $3b$, $3c$ and $3d$, and as may be necessary, means for cooling them and for providing them with energizing power such as electric power. In FIG. 26, $111a$ is a reference mark indicating the beam-waist position on the end face of the totally reflecting mirror $1a$; $111b$ is a reference mark indicating the beam-waist position between laser pumping sections $5a$ and $5b$; $100a$ is a reference mark indicating the intermediate position in the excited portion of the laser active medium $4b$; $111c$ is a reference mark indicating the beam-waist position on the end face of the partially transmitting mirror $2a$; $111d$ is a reference mark indicating the beam-waist position between the laser pumping sections $5c$ and $5d$; and $111e$ is a reference mark indicating the position of the beam waist formed on the beam-emitting side of the laser pumping section $5d$.

Moreover, $60a$, $60b$, $60c$ and $60d$ are reference marks indicating optical systems that include thermal lenses formed by the laser active media that are situated respectively between $111a$ and $111b$, $111b$ and $111c$, $111c$ and $111d$, and $111d$ and $111e$. A plurality of optical elements that are arranged along the laser beam axis is referred to as an optical system hereinafter, when it is shown as a whole.

The operation of the conventional example illustrated in FIG. 26 for the present invention is now described. A laser beam 7 generated in the laser oscillator that is constituted by the totally reflecting mirror $1a$, the laser pumping sections $5a$ and $5b$, and the partially transmitting mirror $2a$ passes through the partially transmitting mirror $2a$ and then is extracted from the oscillator and guided into the laser amplifier constituted by the laser pumping sections $5c$ and $5d$, thus forming a laser beam 77 after being amplified in the course of passing through the laser amplifier. In this case, the laser pumping sections $5a$, $5b$, $5c$ and $5d$ are constituted by parts with the same specification and are excited by the same pumping energy.

The laser equipment constituted as shown in FIG. 26 is considered to be, as a whole, a cascade-type laser oscillator and amplifier wherein optical systems $60a$ each acting as a fundamental unit are arranged periodically in series, because the optical systems $60b$, $60c$ and $60d$ are identical to the optical system $60a$, provided that only beam mode shape inside the oscillator and amplifier, and essential factors—focusing elements and propagation distances—which significantly affect the beam mode shape are thought, without taking into account optical properties such as gain, the totally reflecting mirror and the totally transmitting mirror. For this reason, as described thereinafter, the beam diameter in the position $111e$ significantly varies depending on changes in the pumping energy.

In a conventional cascade-type solid-state laser oscillator and amplifier as described above, the diameter of the beam in places in which the wavelength-conversion active media are positioned varies depending on the pumping intensity, and the condition of the wavelength conversion accordingly changes depending on the pumping intensity when wavelength conversion using the extracted beam is carried out, since emitted laser beam diameter and beam wavefront curvature varies significantly depending on the pumping intensity. Moreover, when a laser beam generated in the conventional laser equipment is guided into an optical fiber, the light-guiding conditions depends largely on the laser pumping intensity, since the diameter of the emitted beam and the wavefront curvature varies significantly depending on the pumping intensity. In addition, when a laser beam extracted from the conventional laser equipment is used for machining work, the processing conditions varies depending on the pumping intensity of the laser equipment, e.g., laser beam energy, since emitted beam varies depending on the pumping intensity.

On the other hand, assuming for example that the amplifier portion consisting of the laser pumping sections $5c$ and $5d$ shown in FIG. 26 are independently used as an amplifier and would receive an incident beam through the position $111c$, since the position $111c$ is, from the viewpoint of designing the cascade-type amplifier, the one whereat the beam diameter varies, the beam parameters for the incident beam would need to be changed in accordance with the pumping intensity. Furthermore, when attempting to configure variable-output laser equipment utilizing an incident beam with a constant beam diameter and beam wavefront curvature, and varying the pumping intensity of the amplifier, since the beam behavior in the amplifier would not be that of a cascade type having a periodic structure, there have been problems such as that the design of the amplifier has been complicated, that multiplication of amplification stages has been difficult, and that the volume where the amplified beam mode and the excited region overlap has lessened, hindering high-efficiency amplification.

The present invention has been made to address the foregoing problems of the conventional laser equipment; it is an object of the present invention to provide laser equipment wherein the beam diameter of an emitted laser beam and the wavefront curvature have reduced dependence on the pumping intensity, as well as laser equipment that can efficiently amplify an incident beam having fixed beam parameters.

DISCLOSURE OF INVENTION

According to the present invention, there is provided laser equipment constituted in such a way that a plurality of laser active media each generating a lens effect under excitation are arranged in series along the laser beam axis, and a plurality of beam waists are formed in the laser beam within the region where the plurality of laser active media are arranged, wherein pumping energy for one or more of the laser active media being disposed endwise beyond at least one of the beam waists at either end of the plurality of beam waists is smaller than pumping energy for one or more of the laser active media arranged between two adjacent beam waists among the plurality of beam waists.

According to the invention, laser equipment can be provided wherein variation in beam wavefront curvature and in beam diameter of an emitted beam that depends on change in the pumping energy is small, or wherein an incident beam that remains identical over a wide range of variation in the pumping energy can propagate with its cascade-like beam mode being mostly unchanged; therefore, significantly efficient amplification is enabled.

Moreover, there is provided laser equipment wherein pumping energy for one or more of laser active media being disposed endwise beyond at least one of beam waists at either end of the plurality of beam waists, is made from 25% to 75% of the pumping energy for one or more of laser active media arranged between two adjacent beam waists among the plurality of beam waists.

According to the invention, laser equipment can be provided wherein variation in beam wavefront curvature and in beam diameter of the emitted beam is small, as well as wherein an incident beam that remains identical over a wide range of variation in the pumping energy can propagate further with its cascade-like beam mode being mostly unchanged, and significantly efficient amplification is enabled.

Furthermore, there is provided laser equipment wherein energy for one or more of the laser active media being disposed endwise beyond at least one of the beam waists at either end of the plurality of beam waists is approximately half of the pumping energy for one or more of laser active media arranged between two adjacent beam waists among the plurality of beam waists.

According to the invention, laser equipment can be provided wherein variation in beam wavefront curvature and in beam diameter of the emitted beam is substantially small, as well as wherein an incident beam that remains identical over a wide range of variation in the pumping energy can propagate with hardly any modification to the cascade-like beam mode, and significantly efficient amplification is enabled.

In addition, there is provided laser equipment wherein the laser active media are constituted to be pumped through their end faces, and the laser active medium arranged at the end beyond at least one of the beam waists that are situated in each end position of the plurality of beam waists is pumped through only one end face, whereas one or more of laser active media arranged between two adjacent beam waists among the plurality of beam waists is pumped through both of its end faces.

According to the invention, laser equipment can be provided wherein variation in beam wavefront curvature and in beam diameter of an emitted beam is substantially small, as well as wherein an incident beam that remains identical over a wide range of variation in the pumping energy can propagate with hardly any modification to the cascade-like beam mode, and significantly efficient amplification is enabled.

Moreover, there is provided laser equipment wherein the laser active media are rod-type solid-state laser active media.

According to the invention, laser equipment can be provided wherein variation in beam wavefront curvature and in beam diameter of the emitted beam is substantially small, as well as wherein the effect, of an incident beam that remains identical over a wide range of variation in the pumping energy being able to propagate with hardly any modification to the cascade-like beam mode, is more largely demonstrated.

Furthermore, there is provided laser equipment wherein 90-degree polarization-direction rotators are arranged along the laser beam axis.

According to the invention, laser equipment can be provided wherein difference in beam parameters that depend on the polarization direction is small, and variation in beam wavefront curvature and in beam diameter of the emitted beam is small.

Moreover, there is provided laser equipment wherein the laser beam outputted from the laser equipment is converted in wavelength.

According to the invention, wavelength-conversion-type laser equipment that is operable over a wide range of pumping energy can be provided, wherein variation in wavelength-conversion conditions, and in beam wavefront curvature and in beam diameter of a wavelength-converted beam is small.

Furthermore, there is provided laser equipment wherein the laser beam outputted from the laser equipment is guided into an optical fiber.

According to the invention, laser equipment can be provided wherein the output beam can stably be extracted from an optical fiber regardless of change in pumping energy.

Moreover, there is provided laser equipment wherein the thermal-lens focal length of one or more of laser active media arranged at the end beyond at least one of beam waists that are situated in each end position of a plurality of beam waists is made approximately twice as long as the thermal-lens focal length of one or more of laser active media arranged between two adjacent beam waists among the plurality of beam waists.

According to the invention, laser equipment can be provided wherein variation in beam wavefront curvature and in beam diameter of the emitted beam is substantially small, as well as wherein an incident beam that remains identical over a wide range of variation in pumping energy can propagate with hardly any modification to the cascade-like beam mode; therefore, significantly efficient amplification is enabled.

Still furthermore, there is provided laser equipment wherein a plurality of laser active media that generates a lens effect under excitation is arranged in series on the laser beam axis, and a single beam waist is formed in the laser beam within a region where the plurality of laser active media is arranged, and wherein pumping energy for one or more of laser active media arranged on one of the sides that sandwich the beam waist is made approximately half of the pumping energy for one or more of laser active media arranged on the other side.

According to the invention, laser equipment can be provided wherein variation in beam wavefront curvature and in beam diameter of the emitted beam is substantially small, as well as wherein an incident beam that remains identical over a wide range of variation in the pumping energy can propagate with hardly any modification to the cascade-like beam mode; therefore, significantly efficient amplification is enabled.

Moreover, there is provided laser equipment wherein in a laser resonator that includes between a totally reflecting mirror and a partially reflecting mirror a plurality of laser active media that generates a lens effect under excitation, a beam waist is included; and pumping energy for one or more of laser active media arranged between the beam waist and the totally reflecting mirror is made approximately the same as pumping energy for one or more of laser active media arranged between the beam waist and the partially reflecting mirror.

According to the invention, laser equipment can be provided wherein damage to optical elements does not readily occur, and variation in beam wavefront curvature and in beam diameter of the emitted beam is small.

Still moreover, there is provided laser equipment wherein a plurality of laser active media each generating a lens effect under excitation are arranged in series along a laser beam axis so as to enable a laser beam to propagate in a cyclic propagation shape, wherein the laser beam is made to enter or to be emitted through the vicinity of collimating points in the cyclic propagation shape.

According to the invention, laser equipment can be provided wherein variation in beam wavefront curvature and in beam diameter of the emitted beam is small even when pumping energy is changed, as well as wherein an incident beam that remains identical over a wide range of variation in the pumping energy can propagate with its cascade-like beam mode being mostly unchanged; therefore, significantly efficient amplification is enabled.

In addition, there is provided a laser machining device according to the present invention, wherein the laser equipment is used as a beam source.

According to the invention, laser equipment is made available wherein machining work can stably be carried out regardless of change in the output power.

Furthermore, there is provided a laser-equipment pumping method according to the present invention. In the laser equipment constituted in such a way that a plurality of laser active media that generates a lens effect under excitation is arranged in series along the laser beam axis, and that a plurality of beam waists is formed in the laser beam within the region where the plurality of laser active media is arranged, the laser-equipment pumping method is implemented to excite the laser equipment in such a way that pumping energy for one or more of the laser active media being disposed endwise beyond at least one of the beam waists at either end of the plurality of beam waists is made approximately half of the pumping energy for one or more of the laser active media arranged between two adjacent beam waists among the plurality of beam waists.

According to the invention, laser equipment can be implemented wherein variation in beam wavefront curvature and in beam diameter of the emitted beam is substantially small, as well as wherein an incident beam that remains identical over a wide range of variation in pumping energy can propagate with hardly any modification to the cascade-like beam mode; therefore significantly efficient amplification is enabled.

BRIEF DESCRIPTION OF DRAWINGS

FIG. 26 is a schematic block diagram of conventional laser equipment.

BEST MODE FOR CARRYING OUT THE INVENTION

Embodiment 1

Figure 1:
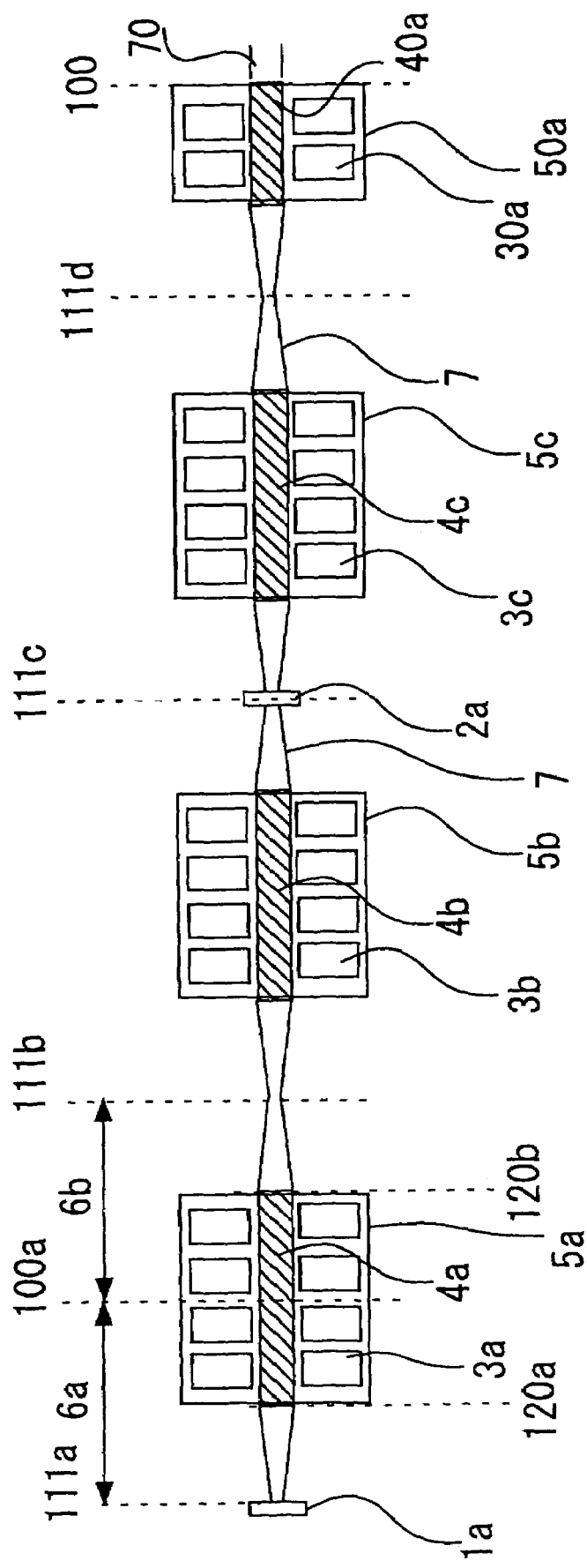
FIG. 1 is a schematic block diagram of laser equipment according to Embodiment 1 of the present invention.

FIG. 1 is a view for explaining laser equipment and its pumping method according to Embodiment 1 of the present invention, and more particularly is a block diagram of the laser equipment. In FIG. 1, 1a is a totally reflecting mirror with a plane curvature; 2a is a partially transmitting mirror with a plane curvature; 3a, 3b, 3c and 30a are laser-active-media-pumping devices such as LD (Laser diodes) and lamps; 4a, 4b, 4c and 40a are rod-type solid-state laser active media made of Nd YAG; 5a, 5b, 5c and 50a are laser pumping sections. A laser oscillator is constituted by arranging two laser pumping sections 5a and 5b between the totally reflecting mirror 1a and the partially transmitting mirror 2a. In addition, two other laser pumping sections 5c and 50a are arranged as an amplifier outside the laser oscillator 50a is the laser pumping section arranged at the output end and includes the laser active medium 40a and the laser-active-medium pumping device 30a.

Three laser pumping sections 5a, 5b and 5c are constituted identical to each other, that is to say, in such a manner that the laser active media 4a, 4b and 4c are identical to each other in specifications such as size, shape and Nd-atom doping concentration, and that the laser-active-medium pumping devices 3a, 3b and 3c are also constituted identical to each other, that is, in the pumping energy, the pumping energy density and the pumping beam absorption properties of the laser active media. Moreover, the total energy that excites the laser active medium 40a arranged in the laser pumping section 50a is half of the total pumping energy of each of the laser active media 4a, 4b and 4c arranged in the pumping sections 5a, 5b and 5c; the length of the excited portion of the laser active medium 40a is half of the length of the excited portion of each of the other laser active media 4a, 4b and 4c. In other words, in the laser active medium 40a, the portion that is half of the laser active media 4a, 4b and 4c in length is excited by the same pumping energy density as are the laser active media 4a, 4b and 4c.

The constitution of laser equipment according to Embodiment 1 is now described in detail. In FIG. 1, 111a is a reference mark indicating the beam-waist position on the end face of the totally reflecting mirror 1a. 100a is a reference mark indicating the intermediate position in the excited portion of the laser active medium 4a. 111b is a reference mark indicating the beam-waist position between laser pumping sections 5a and 5b. 111c is a reference mark indicating the beam-waist position on the partially transmitting mirror 2a. 111d is a reference mark indicating the beam-waist position on the beam-emitting side of the laser pumping section 5c. 6a is an optical system that ranges from the position 111a to the position 100a. 6b is an optical system that ranges from the position 100a to the position 111b. Since each of the optical systems 6a and 6b includes half of the excited portion of the laser active medium 4a, with regard to optical properties along a laser beam axis, each of the optical systems 6a and 6b includes one half of a thermal lens that the laser active medium 4a forms by being excited and heated. In other words, each of the optical systems 6a and 6b includes a thermal lens the focal length of which is twice as long as that of the thermal lens formed by the laser active medium 4a. In addition, the three laser pumping sections 5a, 5b and 5c, if only properties such as thermal lenses and optical lengths which significantly affect the mode shape are focused on, are constituted in such a way that the optical systems 6a and 6b are repeated three times in the order of 6a, 6b, 6a, 6b, 6a, 6b from the position 111a to the position 111c along the beam axis. In the present embodiment, as a means for constituting cascade-type laser equipment as described above, each of the laser pumping sections 5a, 5b and 5c is arranged in such a way that the distances between the centers of the laser active media 4a and 4b, and 4b and 4c are identical and is used being provided with the same electric power, which results in equivalence of each of the thermal lenses that are generated by exciting the laser active media.

Since the laser pumping section 50a is constituted in such a way that the pumping energy is half of that of any one of the laser pumping sections 5a, 5b and 5c, and the length of the excited region of the laser active medium 40a is half of that of any one of the other laser active media 4a, 4b and 4c, when the laser active medium 40a is excited, the optical properties along the laser beam axis of the optical system that ranges from the position 111d to the emitting end 100 of the laser active medium 40a are equivalent to the optical system 6a. In other words, since the pumping energy of the laser active medium 40a arranged at the end beyond the beam waist 111d, which is in the endmost position among the beam waists, is half of that of the laser active medium 4c situated between adjacent beam waists 111c and 111d and is half of that of the laser active media 4a and 4b located between the other adjacent beam waists, the focal length of the thermal lens formed by the laser active medium 40a is twice as long.

Referring to the overall structure described above, it is constituted in such a way that the optical systems are arranged in the order 6a, 6b, 6a, 6b, 6a, 6b, and 6a. In the laser equipment constituted in this manner, part of laser beam 7 generated in the laser oscillator that is constituted by the totally reflecting mirror 1a, the partially transmitting mirror 2a, and the laser pumping sections 5a and 5b passes through the partially transmitting mirror 2a and is extracted, passes through the laser amplifier that is constituted by the laser pumping sections 5c and 50a, and then, after being amplified, is extracted as a laser beam 70.

The operation of the laser equipment according to the present embodiment is now described in detail. The FIG. 2 chart represents calculated values of inherent-mode beam diameters, in the position 100a indicated in FIG. 1, vs. the reciprocals of thermal-lens focal lengths, which are in proportion to the pumping energy. The FIG. 3 chart represents calculated values of the reciprocals of inherent-mode beam-wavefront curvature, in the position 100a indicated in FIG. 1, vs. the reciprocals of thermal-lens focal lengths being in proportion to the pumping energy.

Figure 3:
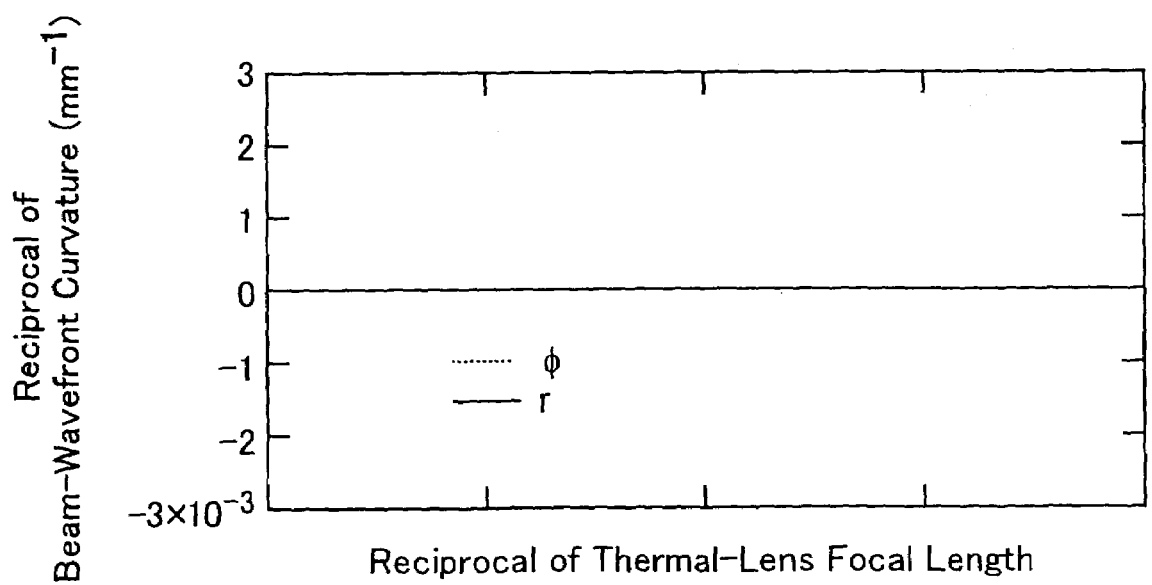
FIG. 3 is an explanatory chart representing the operation of the laser equipment according to Embodiment 1 of the present invention.
Figure 4:
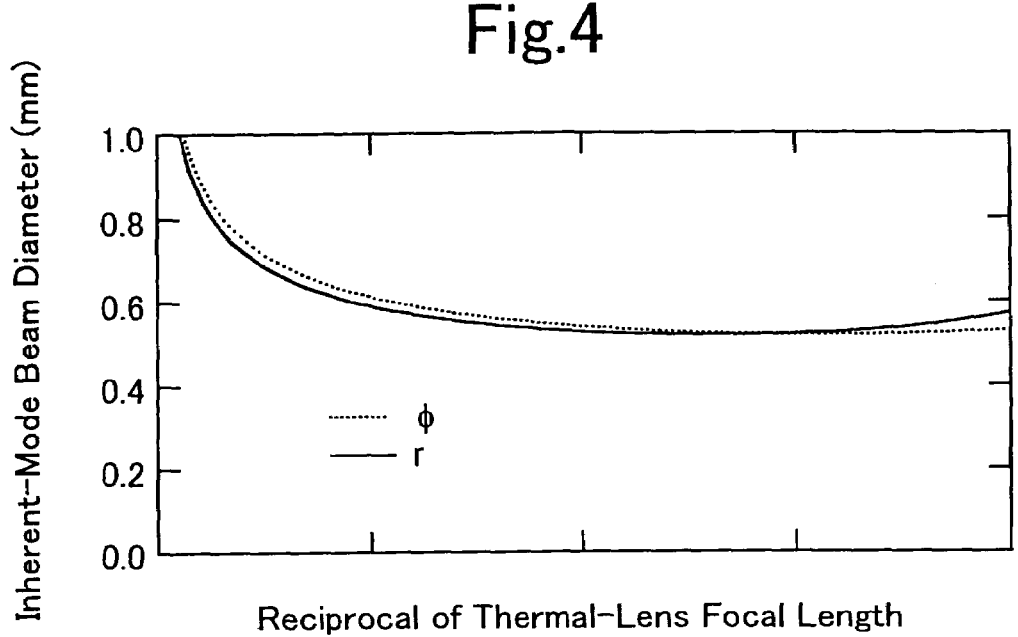
FIG. 4 is an explanatory chart representing the operation of the laser equipment according to Embodiment 1 of the present invention.

The FIG. 4 chart represents calculated values of inherent-mode beam diameters, on the end 120a of the laser active medium 4a indicated in FIG. 1, vs. the reciprocals of thermal-lens focal lengths being in proportion to the pumping energy. The FIG. 5 chart represents calculated values of the reciprocals of inherent-mode beam-wavefront curvature, on the end 120a of the laser active medium 4a indicated in FIG. 1, vs. the reciprocals of thermal-lens focal lengths being in proportion to the pumping energy. The FIG. 6 chart represents calculated values of inherent-mode beam diameters, in the beam-waist position 111a, vs. the reciprocals of thermal-lens focal lengths being in proportion to the pumping energy. The FIG. 7 chart represents calculated values of inherent-mode beam-wavefront curvature, in the beam-waist position 111a, vs. the reciprocals of thermal-lens focal lengths being in proportion to the pumping energy. In FIGS. 2 through 7, the dotted lines signify circumferential-direction polarization component (direction $\Phi$) and solid lines signify radial-direction polarization component (direction r), respectively. The positional dependency of the beam diameter of an actual laser beam is approximately the same as that of inherent-mode beam diameter of the optical system, and thus the wavefront curvature of the actual laser beam is approximately the same as that of the inherent-mode beam-wavefront curvature of the optical system. In addition, in FIG. 3 and FIG. 7, the dotted lines representing the properties of circumferential-direction polarization component (direction $\Phi$) coincide with the solid lines representing the properties of radial-direction polarization component (direction r).

Parameters used for the calculations for FIGS. 2 through 7 are described below. The laser active medium was assumed to be an 80 mm long rod made of Nd:YAG, and the rod length was taken to be 80 mm. In addition, the central 40-mm part out of the 80 mm rod length was taken to be the excited region. The refractive-index distribution in a rod cross-section of the excited region, according to "Solid-state Laser Engineering, 5th edition" by W. Koechner, p. 408-419, varies depending approximately on the square of distance r from the center as follows:

$$n(r)=n_0-n_2/2\times r^2$$

wherein $n_0=1.82$, and $n_2$ differs by the circumferential-direction polarization component (direction $\Phi$) and by the radial-direction polarization component (direction r), and varies depending on the pumping energy density while maintaining the relationship $n_{2r}=n_{2\Phi}\times 1.2$, $n_2$ being approximately proportional to the pumping energy. For this reason, the direction $\Phi$ of $n_2$ was decided so as to range from 0 to $0.8\times 10^{-4}$ ($n_2=0$ at the leftmost point of the abscissa, $n_2=0.8\times 10^{-4}$ at the rightmost point in FIGS. 2 through 7) and the direction r was decided so as to range from 0 to $0.96\times 10^{-4}$ ($n_2=0$ at the leftmost point of the abscissa, $n_2=0.96\times 10^{-4}$ at the rightmost point in FIGS. 2 through 7). Moreover, the constitution of the resonator is symmetrical with respect to the center of the rod and the calculations were carried out under the constituent condition that the distance between the rod end and the mirror end is made 400 mm (from 120a to 111a). In addition, the proportional coefficient between $n_2$ and the pumping energy density can precisely be measured through experiments such as measurement of the thermal-lens focal length by passing a probe beam through the laser active medium. The relationship between $n_2$ and the pumping energy changes depending on the constitution of the pumping section and pumping beam absorptance, and when a Nd YAG rod with a diameter of several mm and a pumped portion length of several dozen mm is excited from the side by a laser diode (LD), the average power of the pumping LD will be at the several hundred W to several kW level, which is the $n_2=1.0\times 10^{-4}$ level.

Figure 2:
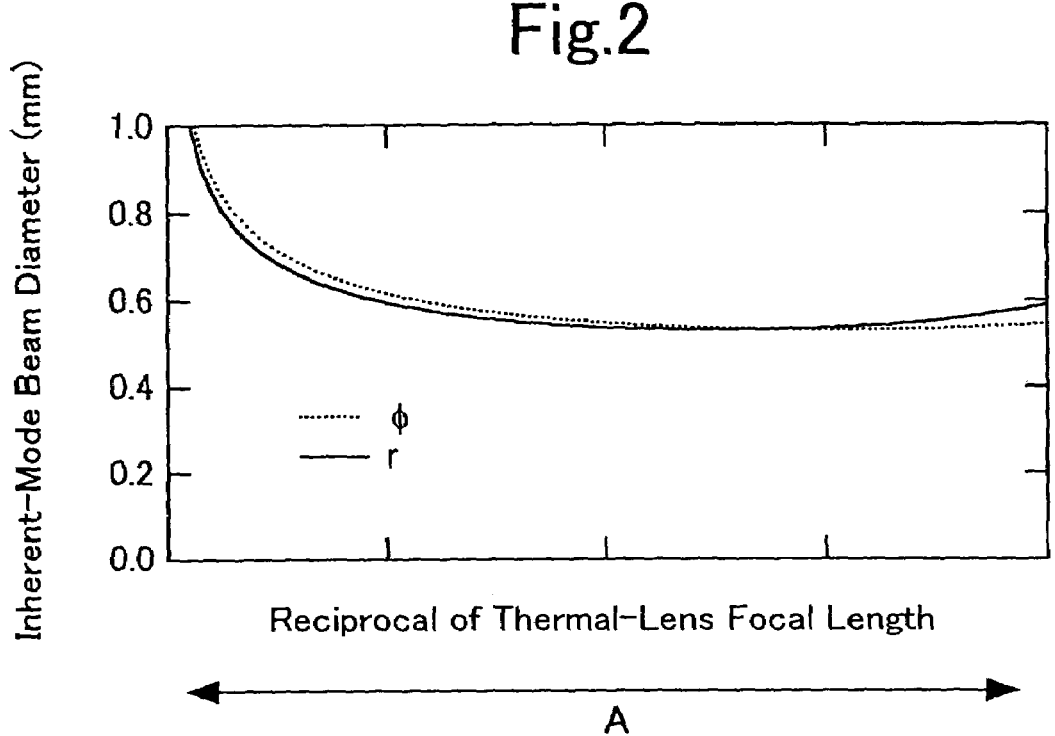
FIG. 2 is an explanatory chart representing the operation of the laser equipment according to Embodiment 1 of the present invention.
Figure 5:
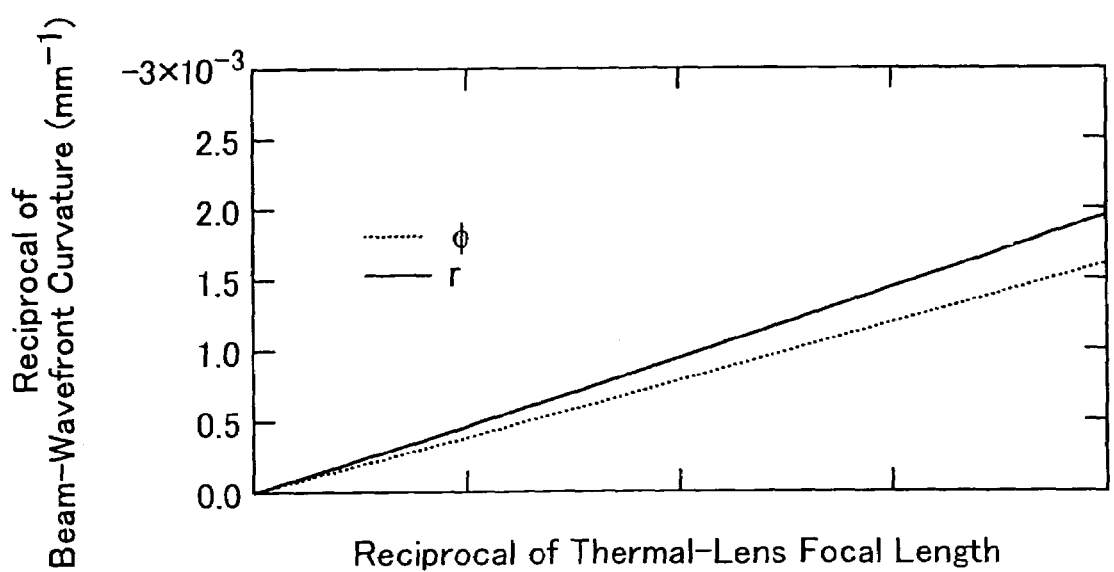
FIG. 5 is an explanatory chart representing the operation of the laser equipment according to Embodiment 1 of the present invention.
Figure 6:
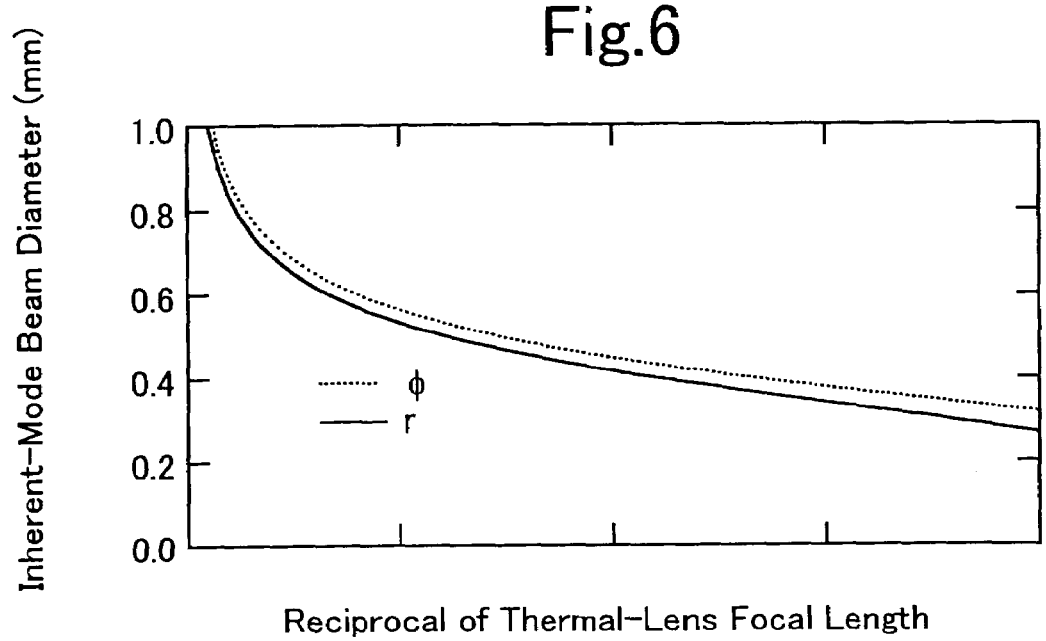
FIG. 6 is an explanatory chart representing the operation of the laser equipment according to Embodiment 1 of the present invention.

It is understandable through comparison among FIGS. 2, 4 and 6 that the variation in the beam diameter vs. the pumping energy is small in the intermediate position 100a of the excited region of the laser active medium, and in the laser-active-medium end 120a, which correspond respectively to FIGS. 2 and 4. On the other hand, it is understandable through the comparison among FIGS. 3, 5 and 7 that the variation in the laser-beam-wavefront curvature vs. the pumping energy is small in the position 100a, and in the position 111a, which correspond respectively to FIGS. 3 and 7. As described above, it is understandable based on FIGS. 2 through 7 that the variation both in laser-beam-wavefront curvature and in beam diameter is small in the intermediate position 100a of the excited region of the laser active medium. These conditions are satisfied over most of the pumping energy range indicated by A in FIG. 2.

In the laser equipment constituted as illustrated in FIG. 1, since the optical systems 6a and 6b recur in the order 6a, 6b, 6a, 6b, 6a, 6b and 6a along the beam axis from the position 111a to the position 111c, the state of the variation in the laser-beam diameter and in the wavefront curvature, which have been set forth in FIGS. 2 through 7, also recurs according to the arrangement of these optical systems. Accordingly, the laser-beam output position 100 is the point equivalent to the position 100a in terms of the variation in the laser-beam diameter and in the wavefront curvature, so that laser equipment can be provided, wherein the variation both in the output-beam-wavefront curvature and in diameter has small dependence on the pumping energy over almost all the operative range where the equipment can safely operate.

In other words, in beam modes from a periodic constitution wherein equivalent constitutions with plane-curvature mirrors arranged in positions of equal distance from both ends of Nd:YAG rods are combined, the beam curvature in the two positions corresponding to the planar mirrors and to the intermediate point of the Nd:YAG rod is always planar. The positions corresponding to the plane-curvature mirrors are apart from the lenses, and are so-called condensing points whereat the beam diameter is small and the beam diameter significantly varies depending on the pumping intensity; in contrast, the positions corresponding to the intermediate points of the Nd:YAG rods are the emitting points from the lenses and are so-called collimating points whereat the beam diameter is large, and the variation in the beam diameter dependent on the pumping intensity is small. An output laser beam having small dependence on the pumping intensity can be obtained by extracting the beam from a collimating point in the periodic beam propagation. In contrast, in the conventional laser equipment described in FIG. 26, since either the position 111a, 120a, or a position between the two has been employed as the beam-output position, if the pumping energy, e.g. laser output, is changed, the beam diameter and/or the beam-wavefront curvature, as represented in FIGS. 4 and 5 or FIGS. 6 and 7, have/has significantly varied.

In the calculations represented in FIGS. 2 through 7, cases wherein the laser equipment is ideally constituted according to design, and there is no problem such as dispersion in the pumping energy of each laser pumping section, nor in the thermal-lens focal length of each laser active medium, have been described. In the following, the effect of the present invention a case where the pumping energy of the laser active medium 40a arranged in the laser pumping section 50a deviates from being half of that of other laser active media 4a, 4b, and 4c . . . in other words, a case where the thermal-lens focal length of the laser active medium 40a deviates from being double that of the laser active media 4a, 4b, and 4c . . . is described.

Figure 7:
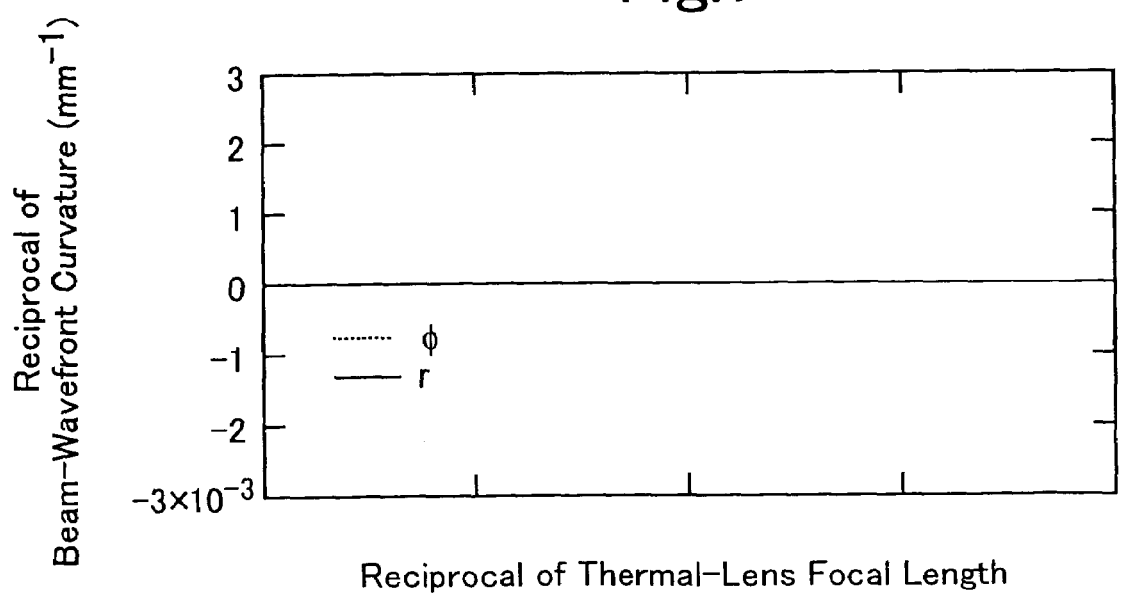
FIG. 7 is an explanatory chart representing the operation of the laser equipment according to Embodiment 1 of the present invention.
Figure 8:
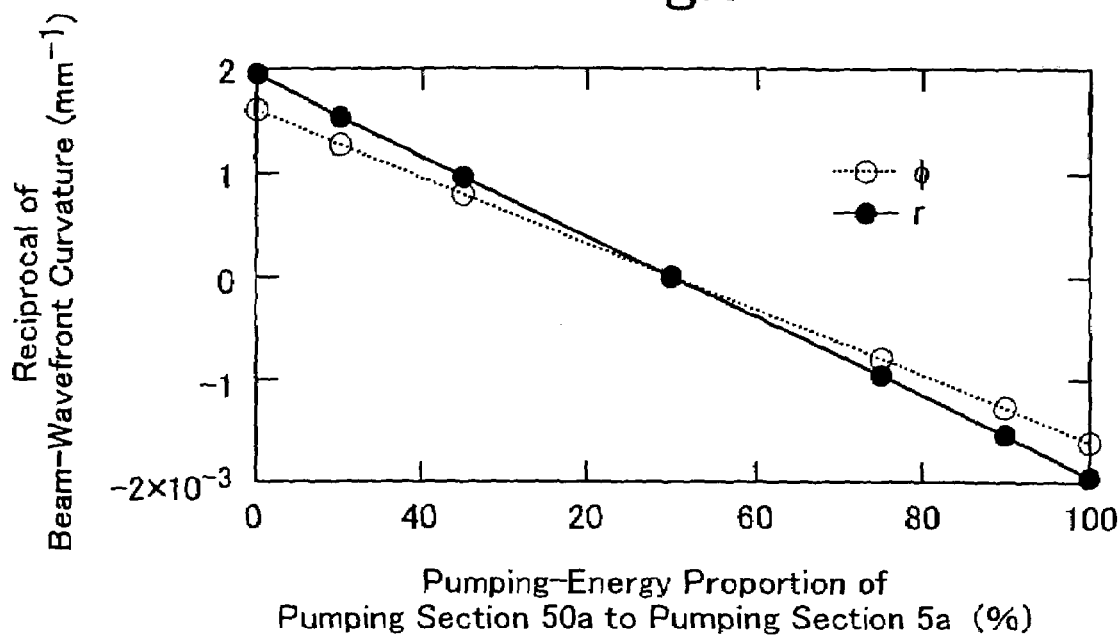
FIG. 8 is an explanatory chart representing the tolerance for variation and drift in the laser equipment according to Embodiment 1 of the present invention.
Figure 9:
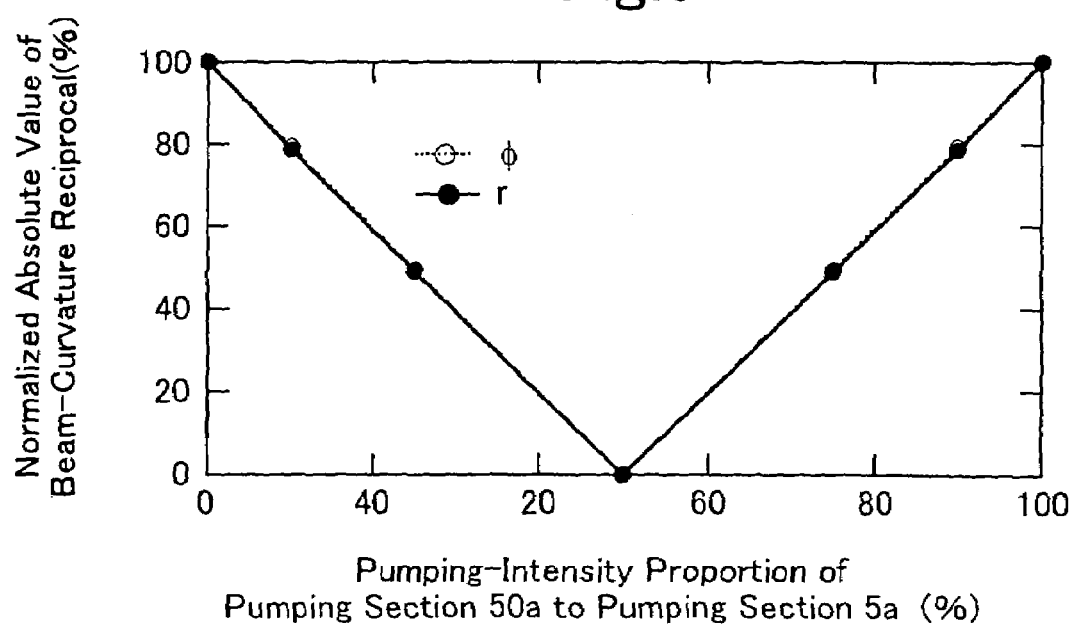
FIG. 9 is an explanatory chart representing the tolerance for variation and drift in the laser equipment according to Embodiment 1 of the present invention.

FIG. 8 is the chart of the reciprocals of beam-wavefront curvature in the position of the emitting end 100, plotted assuming all of the pumping energy densities of the excited regions of the laser pumping sections 5a, 5b, 5c, and 50a to be constant at the values ($n_{2r}=0.96\times 10^{-4}$, $n_{2\Phi}=0.8\times 10^{-4}$) of the left end of the abscissas of FIGS. 2 through 7, and varying the length of the portion of the laser pumping section 50a that is excited, in a range of from 0 to 100% of the portion of the laser pumping sections 5a, 5b and 5c of FIG. 1 that is excited. Namely, it corresponds to what results when the proportion of the total pumping energy of the laser active medium 40a in the laser pumping section 50a to that of the laser active medium 4a in the laser pumping section 5a is varied from 0% to 100%. The $\Phi$ and r in the FIG. 8 represent the calculated values for the circumferential-direction polarization component and radial-direction polarization component, respectively. FIG. 9 is obtained by taking the absolute values of the ordinates of FIG. 8 and normalizing to values at 100%.

It turns out from FIG. 9 that the variation in the beam-wavefront curvature does not depend on the polarization direction, and the beam-wavefront curvature is suppressed to the smallest value in the case where the total-pumping energy proportion is exactly 50%, i.e., in the case described in FIG. 3, and increases as the proportion approaches to 0% or 100% from 50%. It turns out from FIG. 9 that the present invention demonstrates the largest effect in the case where not only the final-stage laser pumping energy is made to coincide with half of that of the foregoing stage, but also where the pumping density is constant along the beam axis of the excited region of all the laser active media; and the effects of the present invention should be present if the pumping energy of the laser pumping section 50*a* is made less than that of the laser pumping sections 5*a*, 5*b* and 5*c*, wherein compared with the conventional laser equipment shown in FIG. 26, i.e., the case wherein the proportion is 0% or 100% in FIG. 9, the variation in the beam-wavefront curvature can be made smaller. Especially, the calculation example in FIG. 9 shows that variation in the reciprocal of the beam-wavefront curvature can be decreased to be approximately half as much as is conventional if the pumping energy is set to be from 25% to 75% of that of the laser pumping sections 5*a*, 5*b*, and 5*c* in FIG. 1. It is more preferably set to be from 40% to 60% in order to suppress variation in the beam-wavefront curvature reciprocal to be 20% or less.

Figure 10:
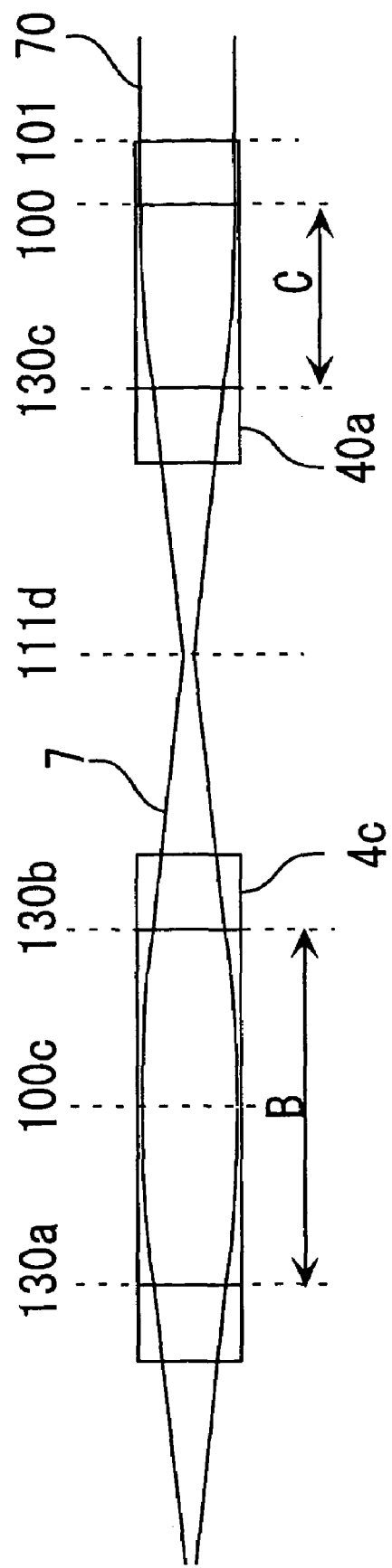
FIG. 10 is an enlarged view of principal parts of the laser equipment according to Embodiment 1 of the present invention.

The equipment constitution of the portion from which a beam is extracted and the variation in the beam diameter are described here in more detail with reference to FIG. 10 which is the enlarged view illustrating the laser active media 4*c* and 40*a* of the laser pumping sections 5*c* and 50*a*, respectively. In FIG. 10, the laser active medium 4*c* is excited from a position 130*a* to a position 130*b*, i.e., the region indicated as B, and a thermal lens is formed in the region; the laser active medium 40*a* is also excited, from a position 130*c* to the position 100, i.e., the region indicated as C. The laser-beam diameter and the beam-wavefront curvature in the laser equipment illustrated in FIG. 10 vary: as represented in FIGS. 2 and 3, in a position 100*c*; as represented in FIGS. 4 and 5, in the positions 130*a*, 130*b* and 130*c*; as represented in FIGS. 6 and 7, in the position 111*d*; and again as shown in FIGS. 2 and 3, in the position 100 where the pumping section end of the laser active medium 40*b* is situated. That is, the position 100 is the one where neither the beam diameter nor the beam-wavefront curvature has substantially any variation dependent on the pumping energy. Moreover, while the variation in the beam diameter of the laser beam 7 on the laser beam axis is symbolically illustrated in FIG. 10, the optical properties of the unexcited portion do not vary depending on the pumping energy. Therefore, in a position 101 that is a laser-active-medium end to which the beam has slightly propagated through a laser active medium which is not excited, i.e., in which no thermal lens forms, as well as in the position 100, which is the pumped end, it goes without saying that the pumping energy-dependent variation in the beam diameter and in the beam-wavefront curvature is small.

Here, in the embodiment illustrated in FIG. 1, no mode-selection aperture is described in the laser oscillator; and although the case where the cross section of the rod-type laser active medium functions as a mode-selection aperture of the oscillator has been described, even when a mode-selection aperture is arranged in the oscillator, or even when the gain distribution of the laser active medium determines the horizontal mode, it goes without saying that the effect, according to the present invention, of extracting a large-diameter collimating beam without depending on the pumping intensity can also be demonstrated. Furthermore, when a mode-selection aperture is arranged in a position near the rod-type laser active medium, it goes without saying that the effect, according to the present invention, of suppressing the variation in the beam diameter that depends on the pumping intensity can also be demonstrated.

In addition, although in the embodiment illustrated in FIG. 1 the case where two laser pumping sections are arranged in the laser oscillator and two laser pumping sections are used as a laser amplifier has been described, the number of pumping sections which constitute the oscillator and the amplifier can be changed as may be necessary. Moreover, although in FIG. 1, all laser pumping sections are set to be a side-pumping type constitution which perpendicularly excites the laser active medium from the sides, any pumping method such as end-face excitation may be used. Moreover, the laser active media may be solid-state ones other than Nd YAG, such as Nd: YLF, Nd: YVO4, and Yb: YAG.

Moreover, in the case of the embodiment illustrated in FIG. 1, rod-type solid-state laser active media are used as laser active media; since a rod-type solid-state laser active medium has a long excited region in the beam axis direction and can be readily arranged in a cascade, the rod-type solid-state laser active medium can more easily demonstrate the effect of the present invention. However, since thermal lenses vary with changes in pumping energy, the effect can also be demonstrated by applying the present invention to other-shape solid-state laser active media such as a slab-shape or a disk-shape medium. Moreover, other laser active media than solid-state laser active media, such as gases and liquids, the refractive index or refractive-index distribution of which varies depending on the pumping energy, may be used. Moreover, the same constitution may be adopted in pulse laser equipment such as Q-pulse-oscillation-type and mode-locked-type equipment, as well as in continuous-oscillation laser equipment, or pumping methods such as pseudo-continuous pumping may be adopted.

These also apply in each of the following embodiments, although they may not be especially described.

Embodiment 2

Figure 11:
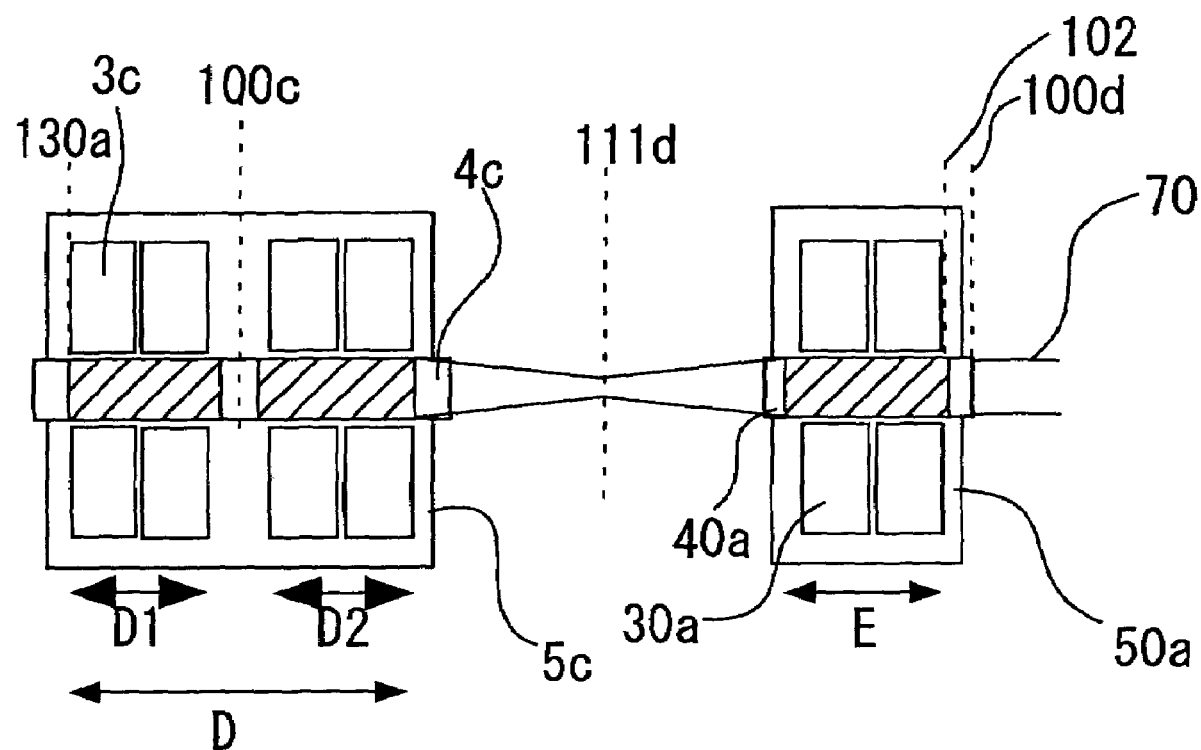
FIG. 11 is an enlarged view of principal parts of a configuration for laser equipment according to Embodiment 2 of the present invention.

FIG. 11 is a view for explaining laser equipment and its pumping method according to Embodiment 2 of the present invention, and more particularly, is a schematic diagram illustrating laser pumping sections, i.e., FIG. 11 is an example of constitution of the laser pumping sections 5*c* and 50*a* in Embodiment 1, with LDs (laser diodes, i.e., a semiconductor laser) as pumping sources. Among the regions in the beam-axis direction of laser active media, in FIG. 11, only the portions illustrated as regions D1, D2, and E are excited, and the excited region D is divided into two regions D1 and D2. 130*a* is the end position of the excited region of the laser active medium 4*c*, and 102 is an end position of the excited region of the laser active medium 40*a*. Moreover, 10*d* is an end position of the laser active medium 40*a*.

In the embodiment illustrated in FIG. 11, the excited region of the laser active medium 4*c* is divided into two portions D1 and D2. Also in this situation, a beam-extraction position can be chosen in the same position as the position 100 in FIG. 10, whereat the variation in beam diameter and beam wavefront curvature is small, by setting the total pumping energy of the laser active medium 40*a* to be half of the pumping energy of the laser active medium 4*c* and by arranging the optical system from the position 100*c* to the position 111*d* and the one from the position 11*d* to the position 10*d* in such a way that the both the optical systems are symmetrical to each other with respect to the position 111*d*.

Moreover, in FIG. 10 and FIG. 11, although the case illustrated is one where the number of laser active media arranged on the end is one, the pumping energy is approximately half of the other laser active medium, and the excited region is in one place, the number of laser active media arranged at the end beyond the beam waist 111d may be plural, or one laser active medium may be divided into a plurality of excited regions that are excited. In this case, what is necessary is just to make the total pumping energy of the laser active medium arranged at the end beyond the beam waist 111d approximately half of the pumping energy of the laser active medium 4c, i.e., the laser active medium situated between adjacent beam waists.

Moreover, although in Embodiments 1 and 2, the laser active medium 40a is constituted in such a way that the excited region is half of the laser active media 4a, 4b, and 4c in length and has the same pumping energy density per unit length as the laser active media 4a, 4b; and 4c, the same effects as those in Embodiments 1 and 2 are demonstrated by making the length of the laser active medium 40a the same as that of the laser active medium 4a, and by exciting the laser active medium 40a by pumping energy half as dense as that of the laser active medium 4a. That is, the same effects as with Embodiments 1 and 2 are demonstrated by making the laser pumping energy of the laser pumping section in the position from which the laser beam 70 is extracted approximately half of the laser pumping energy of the other laser pumping sections, i.e., those located between adjacent beam waists.

Moreover, also cases where another pumping method and laser active media of other forms are used, if the thermal lens in the portion, through which the laser beam passes, of the laser active medium corresponding to 40a of Embodiment 1 is approximately half—i.e., if the thermal-lens focal length is approximately double—that of the thermal lenses in the portions, through which the laser beam passes, of laser active media corresponding to 4a, 4b, and 4c of Embodiment 1, the same effects as those of Embodiment 1 will be demonstrated.

In addition, in Embodiment 2, although it has been described that laser equipment wherein the variation in the beam wavefront curvature and beam diameter of the emitted beam 70 is very small can be obtained when the laser pumping energy of the laser pumping section that is the portion from which the laser beam 70 is extracted is approximately half of that of the other laser pumping sections, i.e., the ones located between adjacent beam waists, as described in Embodiment 1, the laser pumping energy is not limited to be approximately half; if the laser pumping energy of the laser pumping section that is the portion from which laser beam 70 is extracted is made smaller than that of the other laser pumping section (e.g., from 25% to 75%, preferably from 40% to 60%), laser equipment having an emitted beam in which the dependency of the beam wavefront curvature and beam diameter on the pumping energy is low can be obtained. Also in each of the following embodiments does this apply although this is not especially described.

Embodiment 3

Figure 12:
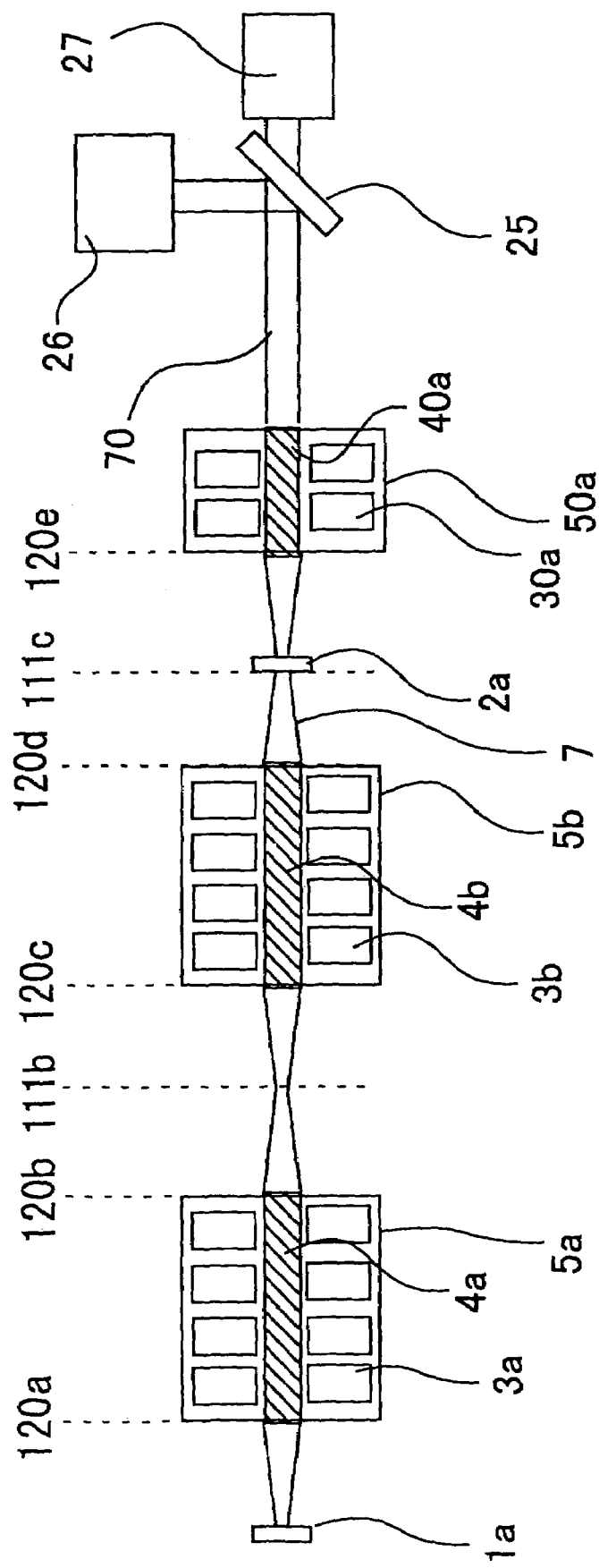
FIG. 12 is a schematic block diagram of laser equipment according to Embodiment 3 of the present invention.

FIG. 12 is a view for explaining laser equipment and its pumping method according to Embodiment 3 of the present invention, and more particularly is a block diagram illustrating the laser equipment. In FIG. 12, 25 is a laser-beam-return mirror having high reflectance to an infrared beam with an incident angle of 45 degrees; 26 is a power meter; 27 is a commercially available beam monitoring device that can monitor the distance between its own position and the position where the wavefront curvature of a laser beam is infinite, and the beam diameter in that particular position.

Demonstrative experiment according to the present invention, which was carried out with laser equipment that utilized the side-LD-pumping type Nd: YAG rod laser and was constituted as shown in FIG. 12, is set forth hereinafter. In the laser pumping sections 5a and 5b, 16 LDs (laser diodes) 3a and 3b, which are laser-active-medium pumping devices, are arranged so as to form four rows along the beam-axis direction; in each row, 4 of the LDs 3a and 3b form 4-fold symmetry with respect to the rod-type solid-state laser active medium 4a or 4b made of Nd YAG (the rod-type solid-state laser active media 4a and 4b have a length of 105 mm, 72 mm of which is an excited portion, and a diameter of 4 mm) as a rotational-symmetry axis. The laser pumping sections 5a and 5b are arranged so as to form a cascade-type constitution constituting a laser oscillator wherein the optical path length between facing ends of the rod-type solid-state laser active media 4a and 4b, i.e., between end faces 120b and 120c, is 800 mm; and the optical path length between the end face 120a of the rod-type solid-state laser active medium 4a and the totally reflecting mirror 1a (with a plane curvature) as well as between an end face 120d of the rod type solid-state laser active medium 4b and partially transmitting mirror 2a (with a plane curvature) is 400 mm.

In the laser pumping section 50a, 8 LDs 30a are arranged so as to form two rows along the beam-axis direction; in each row, 4 of the LDs 30a form 4-fold symmetry with respect to the rod-type solid-state laser active media 40a made of Nd YAG (the rod-type solid-state laser active medium 40a has a length of 70 mm, 36 mm of which is an excited portion, and a diameter of 4 mm) as a rotational-symmetry axis. The laser pumping section 50a is arranged constituting a laser amplifier on the beam axis outside the laser oscillator in such a way that the optical path length from the end face of the partially transmitting mirror 2a facing the laser pumping section 5b to an end face 120e of the rod-type solid-state laser active media 40a facing the partially transmitting mirror 2a is 400 mm.

With this constitution, the major portion of the laser beam 70, which passes through the laser pumping section 50a and is amplified therein, enters the power meter 26 after being reflected by the return mirror 25. Moreover, by monitoring leakage light that is not reflected by the return mirror 25, the position where wavefront curvature is infinite, the beam diameter in the position where wavefront curvature is infinite, and the quality of the beam were measured. By separately measuring the thermal lenses formed by the Nd: YAG rod-type solid-state laser active media 4a and 4b, the current values for the laser pumping sections 5a and 5b were set so that each of the thermal-lens focal lengths of the laser pumping sections 5a and 5b was identical. In addition, by separately measuring the thermal lens formed by the laser active medium 40a, the current value for the LDs 30a of the laser pumping section 50a was set in such a manner that the $n_2$ value (refraction index: $n_{(r)}=n_0-n_2 \times r^2/2$) of the excited region of the thermal lens formed by the Nd: YAG rod-type solid-state laser active medium 40a was the same as the value for the thermal lens formed by the Nd:YAG-rod excited regions of the laser pumping sections 5a and 5b. Moreover, the measurement of the focal lengths of the thermal-lens formed by the Nd:YAG rod-type solid-state laser active media 4a, 4b and 40a was carried out by measuring the thermal-lens focal lengths when a collimated He—Ne laser beam was made to pass through the portion within a 1.5-mm circuit of the center of the Nd:YAG rod-type solid-state laser active media 4a, 4b and 40a, and varying the current value of the pumping LD.

Figure 13:
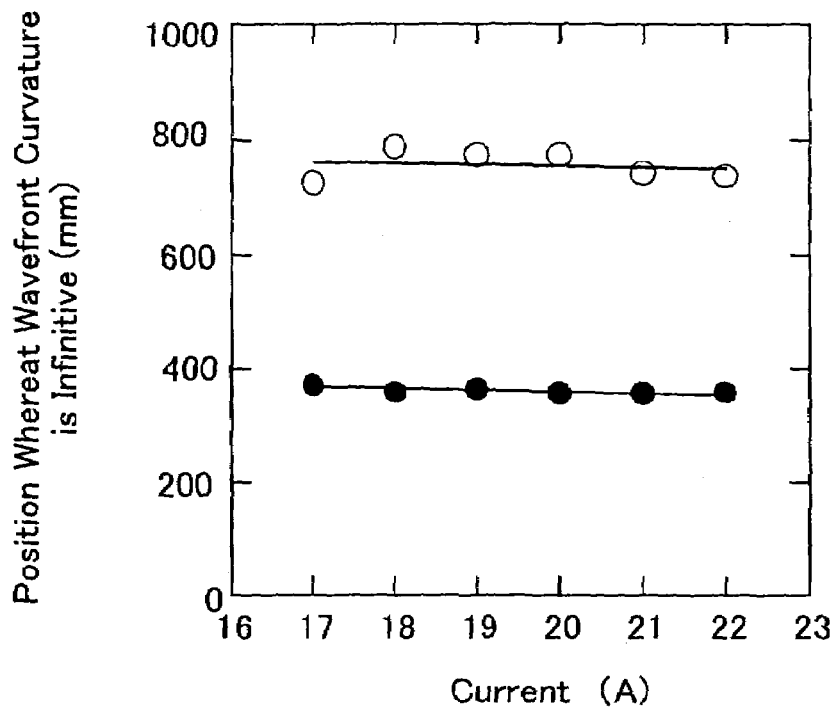
FIG. 13 is an explanatory chart representing the operation of the laser equipment according to Embodiment 3 of the present invention.
Figure 14:
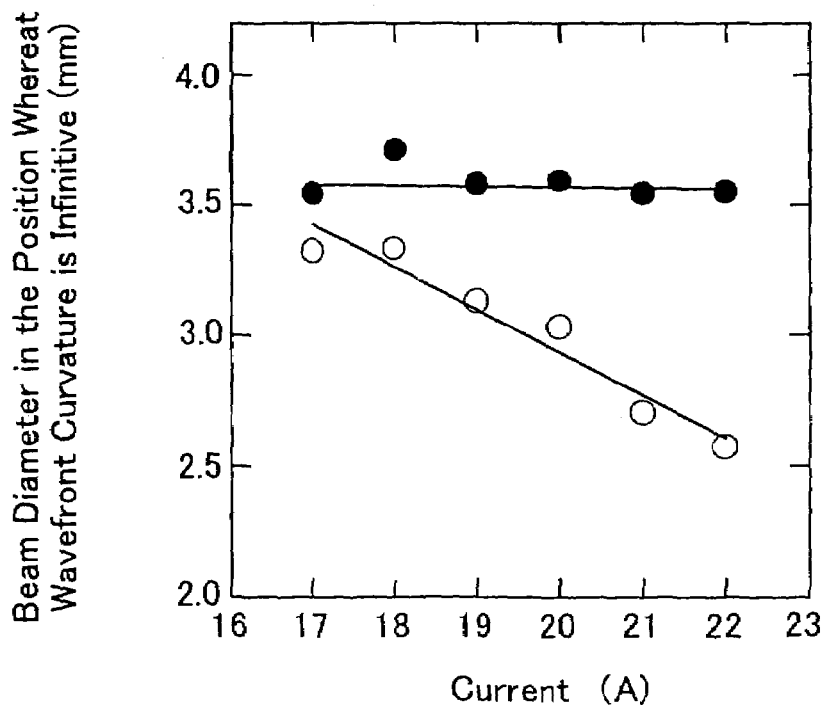
FIG. 14 is an explanatory chart representing the operation of the laser equipment according to Embodiment 3 of the present invention.

In FIG. 13, the black circles represent the actual results, when the laser pumping section 50a was situated as illustrated in FIG. 12, of measuring the positions where the wavefront curvature of the emitted beam 70 at each of the pumping intensity for the laser pumping section 5b was infinite (represented as the distances from the beam monitoring device 27 to the positions where the wavefront curvature was infinite), and white circles represent the actual results, when no laser pumping section 50a was installed, of measuring the positions where the wavefront curvature of the emitted beam 70 at each of the pumping intensity for the laser pumping section 5b was infinite. In FIG. 14, the result of measuring the beam diameter in the positions where wavefront curvature at each pumping intensity for the laser pumping section 5b was infinite are represented, in respective cases with (black circles in the figure) and without (white circles in the figure) the laser pumping section 50a installed. The abscissas (pumping intensity) in FIGS. 13 and 14 are represented using the electric current values for the laser pumping section 5b.

In this situation, with the laser pumping section 50a installed, the position where the wavefront curvature is infinite approximately corresponds to the laser-emitting end of the solid-state laser active medium 40a of the laser pumping section 50a, and the position is the one where the laser beam is collimated. Moreover, as illustrated with black circles in FIG. 13, the variation in the position depending on the pumping intensity is almost so constant as to be within ±4% or less. Furthermore, as illustrated with black circles in FIG. 14, the variation in the value of the beam diameter in this position is 2.0% or less.

On the other hand, without the laser pumping section 50a installed, it turns out that the position where the wavefront curvature is infinite approximately corresponds to the position of partially transmitting mirror 2a, and is equivalent to a beam-waist position. Although the variation in the position is small as illustrated with the white circles in FIG. 13, it turns out, as illustrated with the white circles in FIG. 14, that the value of the beam diameter is 3.3 mm at an electric current value of 17 A, and 2.6 mm at a current of 22 A, which is a variation of 21% or more. As set forth above, it has been proved that with the laser pumping section 50a installed, laser equipment wherein the beam-diameter variation is much smaller than that with the case where the laser pumping section 50a is not installed can be obtained.

It should be understood that effects close to those of the present embodiment may also be demonstrated by making the length of the excited region of the Nd:YAG rod-type solid-state laser active medium 40a of the laser pumping section 50a the same as the length of the excited region of the Nd YAG rod-type solid-state laser active media 4a and 4b of the laser pumping sections 5a and 5b. In that case, however, since the value of the LD driving current used for the pumping LDs 30a of the laser pumping section 50a needs to be below that of the LD driving current used for the pumping LDs 3a and 3b of the laser pumping sections 5a and 5b, there occurs inconvenience such as that with a single power supply a plurality of dc-coupled laser pumping sections cannot be driven, or that complicated current-regulation equipment is required.

A further problem is that if the Nd:YAG rod-type solid-state laser active medium 40a of the laser pumping section 50a is long, in order for a collimated beam to be extracted, $n_2$ of the Nd: YAG rod-type solid-state laser active medium 40a needs to be made small by comparison to laser pumping sections 5a and 5b, and since beam-striking consequently occurs at the rim of the rod on the emitting end of the Nd:YAG rod-type solid-state laser active medium 40a of the laser pumping section 50a, efficient operation cannot be implemented.

What has been described above will be described in more detail. If fine corrections are ignored, the amount of energy extracted from the laser active medium is maximal when the definite integral of the product of the multiplication of the pumping intensity distribution in the excited region of the laser active medium by the intensity distribution of the beam which passes through the laser active medium, over the entire excited region of the laser active medium, is maximal.

In cascade-type laser equipment described in the present invention, in order to make extraction of energy maximal, in most cases the equipment is constituted so that the diameter of the propagation beam is as large as possible, as far as it does not exceed the effective diameter of the laser active media in the direction perpendicular to the beam axis, in the excited region of the laser active media in a plurality of laser pumping sections.

In such equipment, if $n_2$ of the laser pumping section 50a is made smaller than those of the laser pumping sections 5a and 5b, since the diameter of the propagation beam within the laser active medium 50a will be larger than the diameter of those in laser pumping sections 5a and 5b and will exceed the effective diameter of the laser active media, beam-striking will occur in the rim of the rod, giving rise to a problem such as that the efficient operation cannot be implemented.

On the other hand, if the length of the excited region of the Nd YAG rod-type solid-state laser active medium 40a of the laser pumping section 50a is shorter than half of those of the Nd:YAG rod-type solid-state laser active media 4a and 4b of the laser pumping sections 5a and 5b, it is necessary to enlarge $n_2$ of the Nd: YAG rod-type solid-state laser active medium 40a; and in order to extract a collimated beam, the beam diameter on the emitting end will be smaller. Accordingly, since energy cannot sufficiently be extracted from the excited region in the Nd:YAG rod-type solid-state laser active medium, the efficient operation cannot be implemented.

What has been described above will be described in more detail. If fine corrections, such as for the effects of diffraction, are ignored, the amount of energy extracted from the laser active medium is maximal when the definite integral of the product of the multiplication of the pumping intensity distribution in the excited region of the laser active medium by the intensity distribution of the beam which passes through the laser active medium, over the entire excited region of the laser active medium, is maximal.

In such equipment, if the beam diameter in the laser pumping section 50a is smaller than those of the laser pumping sections 5a and 5b, a region where the laser beam intensity is remarkably small is formed in the excited region of the laser active medium in the laser pumping section 50a; the efficient operation cannot be implemented since the definite integral of the product of the pumping intensity distribution in the excited region of the laser active medium and the beam-intensity distribution, over the entire excited region of the laser active medium, is smaller.

In consequence, when the excited-region length of the laser pumping section 50a is made half of those of the laser pumping sections 5a and 5b, the effects of the present invention are demonstrated more greatly.

Embodiment 4

Figure 15:
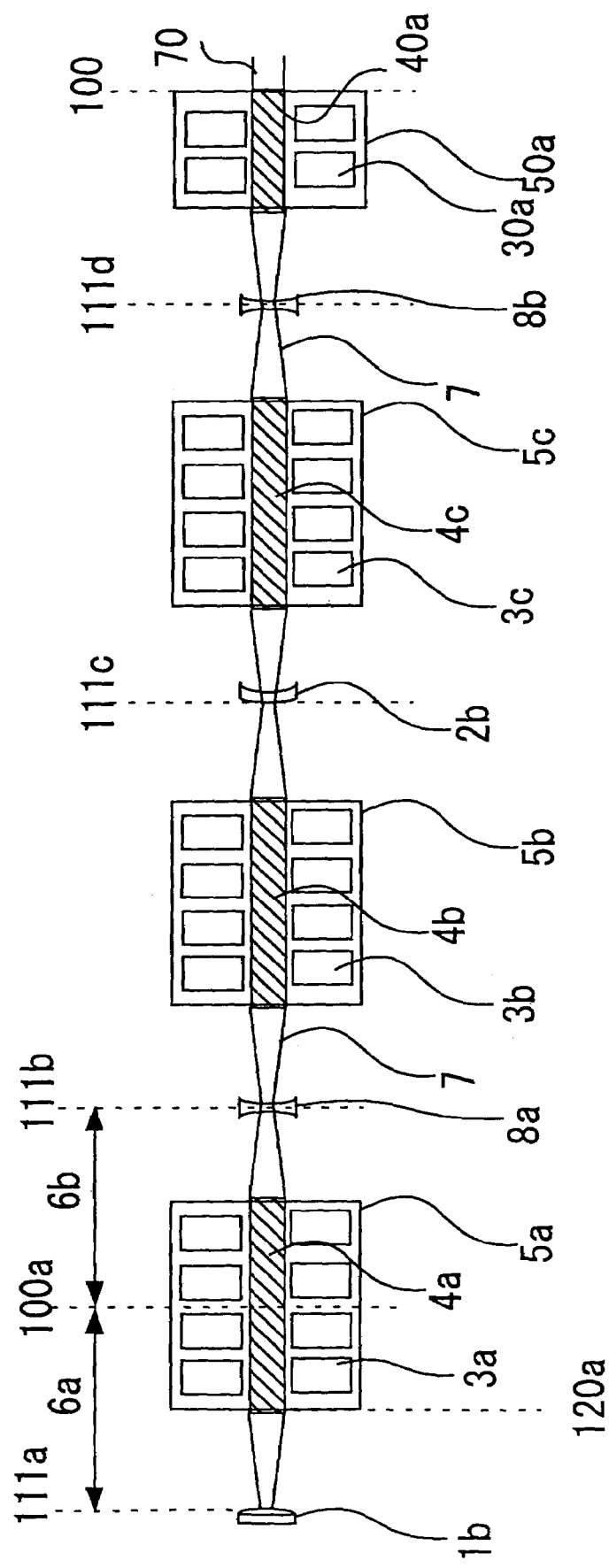
FIG. 15 is a schematic block diagram of laser equipment according to Embodiment 4 of the present invention.

FIG. 15 is a view for explaining laser equipment and its pumping method according to Embodiment 4 of the present invention, and more particularly is a block diagram illustrating the laser equipment. In the present embodiment, the laser equipment constituted using lenses, and mirrors having a curvature is described. In FIG. 15, 1b is a totally reflecting mirror having a curvature; 2b is a partially transmitting mirror having a curvature; 5a, 5b and 5c are the laser pumping sections, which are the same as the laser pumping sections 5a, 5b and 5c illustrated in FIG. 1; 8a and 8b are concave lenses; and the laser pumping section 50a is constituted in such a way that the pumping energy and the pumping region for the laser active medium 40a are half of those of the laser active media 4a, 4b and 4c.

Moreover, 111a is the reference mark indicating a position on the end face of the mirror 1b; 100a is the reference mark indicating an intermediate position in the laser active medium 4a; and 111b is the reference mark indicating a position where the sign of the beam-wavefront curvature in the lens changes.

In FIG. 15, the curvature of the mirrors 1b, 2b and the focal lengths of the lenses 8a, 8b are selected and arranged in such a way that the beam-mode shape in the range from the position 111a to 111b is repeated in the range from 111a to 111d. More particularly, the partially transmitting mirror 2b on its oscillator-facing side has the same curvature as that of the totally reflecting mirror 1b, and also has curvature on its amplifier-facing side, so that both the transmitting output beam from the oscillator and the reflecting inner-oscillator laser beam propagate in both directions, having the same beam wavefront curvature.

Arranging in this way mirrors and lenses between laser active medium and laser active medium enables varying the beam diameter and the beam wavefront curvature of the laser beam in the laser active media in the same way as with the arrangement illustrated in FIG. 1. Therefore, as is Embodiment 1 illustrated in FIG. 1, laser equipment wherein variation in the emitted beam wavefront curvature and beam diameter is less dependent on the pumping energy can be constituted.

In addition, in FIG. 15, although the case where the mirror curvatures of the totally reflecting mirror 1b and the partially transmitting mirror 2b are convex has been illustrated, the mirror curvature of the totally reflecting mirror 1b and the partially transmitting mirror 2b may be concave. Moreover, in such constitution as in FIG. 15, although cases where beam waists between laser pumping sections as illustrated in FIG. 1 are not formed may occur, in such a case, positions corresponding to the beam waists illustrated in FIG. 1, where the sign of the beam wavefront curvature changes depending on the location in the beam-axis direction, occur between laser pumping sections; that is, the positions are equivalent to those of the beam waists.

Embodiment 5

Figure 16:
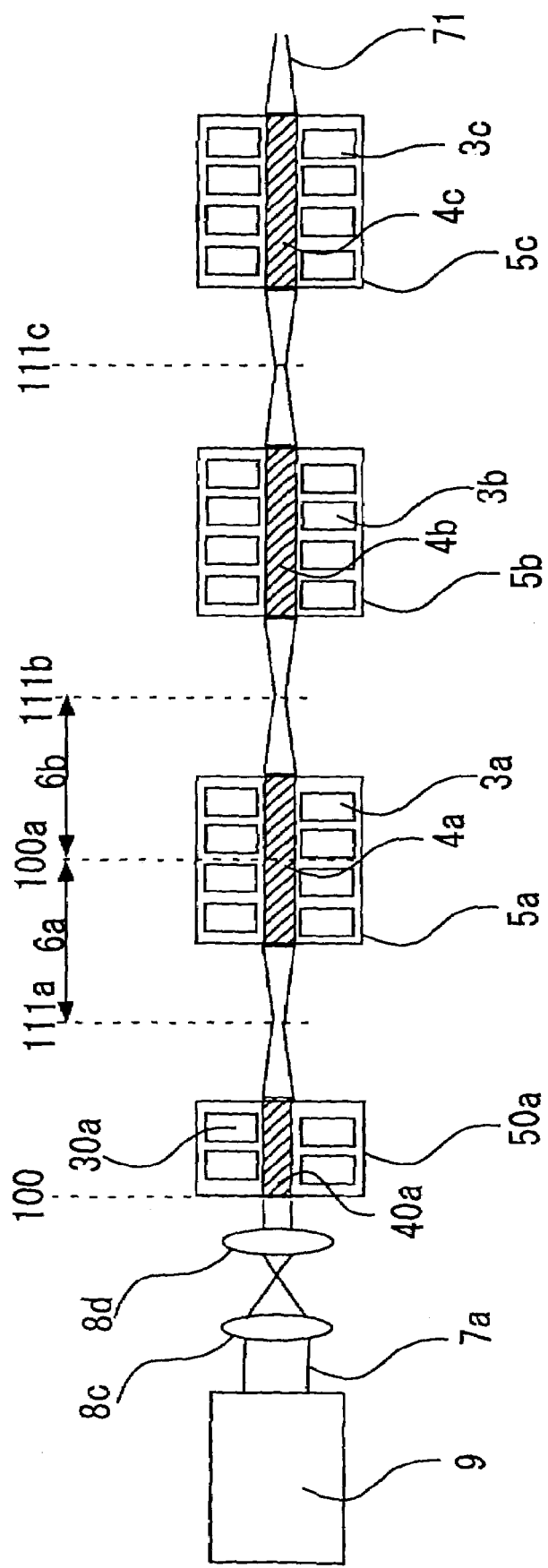
FIG. 16 is a schematic block diagram of laser equipment according to Embodiment 5 of the present invention.

FIG. 16 is a view for explaining laser equipment and its pumping method according to Embodiment 5 of the present invention, and more particularly is a block diagram illustrating the laser equipment. In FIG. 16, 9 is a laser beam generator such as a fiber-laser or a solid-state laser; 7a is a laser beam which originates in the laser beam generator 9; 71 is a laser beam extracted from the laser equipment; and 8c and 8d are lenses for guiding the laser beam 7a, which originates in the laser beam generator 9, into a laser amplifier constituted by the laser pumping sections 50a, 5a, 5b and 5c.

In addition, in FIG. 16, 111a is the reference mark indicating a beam waist between the laser pumping sections 50a and 5a; 100a is the reference mark indicating the intermediate position in the excited region of the laser active medium 4a; and 111b is the reference mark indicating a beam waist between the laser pumping sections 5a and 5b.

Moreover, 6a is the reference mark indicating an optical system between the positions 111a and 100a; and 6b is the reference mark indicating an optical system between the positions 100a and 111b. In the laser pumping sections 5a, 5b and 5c, optical components are arranged so that they implement a cascade-type constitution that repeatedly propagates a beam through the same optical system, i.e., so that they implement a periodic structure that is a thrice-recurrent 6a, 6b, 6a, 6b, 6a, 6b, with the combination of the optical systems 6a and 6b as a unit structure.

Moreover, the laser pumping section 50a is constituted in such a way that an optical system 6b is arranged between the position 100 and 111a so that in terms of optical properties, the position 100a of the optical system 6b corresponds to the position 100, i.e., so that a 6b, 6a, 6b, 6a, 6b, 6a, 6b structure is implemented when the overall constitution including the amplifier constituted by the laser pumping section 50a is indicated. In order to implement such a structure, as is the case with Embodiment 1, i.e., with the laser active medium 40a of the laser pumping section 50a arranged on the output end in FIG. 1, the laser active medium 40a of the laser pumping section 50a arranged on the input end is constituted in such a manner that the energy with which it is excited, its thermal-lens focal length, and the length of its excited region are half, double and half respectively of those of the other laser active media 4a, 4b and 4c.

The laser amplifier constituted in this way, since the position 100 where a laser beam enters is the one equivalent to 100a where the pumping 15' energy-dependent variation in the beam diameter and beam wavefront curvature is small, is constituted in such a way that an incident beam which maintains identicalness over the wide range of variation in the pumping energy of the laser active medium can be propagated without spoiling the cascade-like beam mode. In consequence, since the volume of the portion where the amplified beam mode and the excited region overlap is large, the efficient amplification can be implemented. Furthermore, since the incident beam which maintains identicalness over the wide range of variation in the pumping energy can be utilized, the design of an amplifier can be simplified.

In other words, in the beam mode from a periodic configuration in which constitutions wherein each of two plane-curvature mirrors is arranged at the same distance from either end of the rod-type laser active medium are equivalently combined, the beam curvature is always planar in two locations: the positions corresponding to the plane mirrors, and the intermediate point in the rod-type laser active medium. The positions corresponding to the plane mirrors are so-called condensing points which are away from the lens, and the beam diameter thereat is small; the beam diameter significantly varies depending on the pumping intensity. In contrast, the position corresponding to the intermediate point in the rod-type laser active medium is a so-called collimating point, which corresponds to the emitting point of the lens, and the beam diameter thereat is large; the variation in the beam diameter has small dependence on the pumping intensity. When a beam is made to enter this point, i.e., the collimating point in the periodic beam propagation, not being dependent on the pumping intensity the incident beam can be made to coincide with the propagation mode inside the cascade constitution, whereby highly efficient, stable inner-amplifier propagation without dependence on the pumping intensity can be obtained.

In addition, in Embodiment 5, although a case where the amplifier outputs from the position corresponding to 111$b$, as is the case with conventional laser equipment, has been described, it goes without saying that the variation in the output beam diameter and beam wavefront curvature in response to the pumping energy can be further diminished if a laser pumping section with half pumping energy, as illustrated in Embodiment 1, is arranged also on the output end. Moreover, in the present embodiment, four-stage-amplification constitution using four laser pumping sections is adopted for the laser amplifier but the constitution may be implemented with a different number of pumping sections for the amplifier, and as may be necessary, the laser equipment may be constituted by mirrors with curvature and lenses, as illustrated in Embodiment 4.

Embodiment 6

Figure 17:
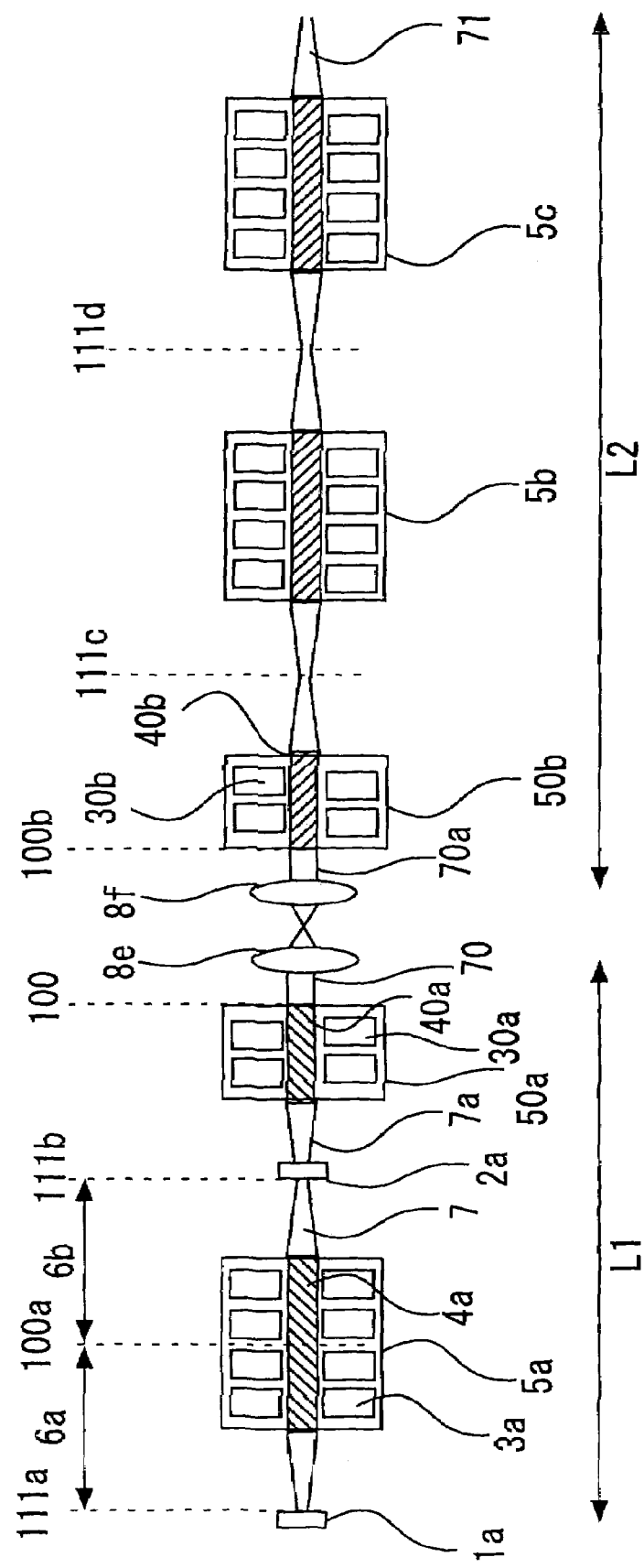
FIG. 17 is a schematic block diagram of laser equipment according to Embodiment 6 of the present invention.

FIG. 17 is a view for explaining laser equipment and its pumping method according to Embodiment 6 of the present invention, and more particularly is a block diagram illustrating the laser equipment. In FIG. 17, a laser oscillator is constituted by arranging the laser pumping section 5$a$ between the totally reflecting mirror 1$a$ and the partially transmitting mirror 2$a$; 7 is the laser beam generated in the laser oscillator; 7$a$ is the laser beam which is extracted from the laser oscillator and is made to enter the laser amplifier constituted by the laser pumping section 50$a$; the laser oscillator and the laser amplifier just described constitute laser equipment L1. The output laser beam 70 of the laser equipment L1 passes through optical elements 8$e$ and 8$f$ and is made to enter the laser amplifier constituted by the laser pumping sections 50$b$, 5$b$ and 5$c$, i.e., laser equipment L2. In this situation, L1 and L2 are constituted respectively in such a manner that the pumping energy of laser pumping section 50$a$ is half of that of the laser pumping section 5$a$; the focal length of the thermal-lens formed by the laser active medium 40$a$ is double of that of the laser active medium 4$a$; the pumping energy of the laser active medium of the laser pumping section 50$b$ is half of those of the laser pumping sections 5$b$ and 5$c$; the focal length of the thermal-lens formed by the laser active medium of the laser pumping section 50$b$ is half of those of the laser pumping sections 5$b$ and 5$c$. In other words, both the laser equipment L1 that is constituted by the laser pumping sections 5$a$, 50$a$, and the laser equipment L2 that is constituted by the laser pumping sections 50$b$, 5$a$ and 5$c$ respectively and separately form configurations that are equal to the end sections of the laser equipment illustrated in FIGS. 1 and 16. In addition, in FIG. 17, 11$a$, 111$b$, 111$c$, and 111$d$ are the reference marks respectively indicating the beam-waist positions; 10$a$ is the reference mark indicating the intermediate position of the excited region of the laser active medium 4$a$; 100 and 100$b$ are the reference marks respectively indicating the positions of the excited-region ends of the laser pumping sections 50$a$ and 50$b$.

The operation of the laser equipment illustrated in FIG. 17 is now described. The laser beam 7$a$ extracted from the laser oscillator constituted by the totally reflecting mirror 1$a$, the partially transmitting mirror 2$a$ and the laser pumping section 5$a$ is outputted as a laser beam 70 after being amplified in the course of passing through the laser amplifier constituted by the laser pumping section 50$a$. The position illustrated by 100 in FIG. 17 is one where the variation in the beam diameter and beam wavefront curvature is small when the pumping energy changes, as is the case of 100 in FIG. 1. As a result, the variation in the beam diameter and beam wavefront curvature of the output laser beam 70 are small against change in pumping energy in the laser equipment L1, as is the output laser beam 70 in FIG. 1. The output beam 70 is transformed via the optical elements 8$e$ and 8$f$ into the incident beam 70$a$ for the following amplification stage. The incident beam 70$a$ is also one with small variation in the beam diameter and beam wavefront curvature against change in pumping energy, since the variation in the beam diameter and beam wavefront curvature against change in pumping energy in the laser equipment L1 is small.

The subsequent laser equipment L2 has the same constitution as the laser equipment in FIG. 16 except that the number of its amplifying stages is one stage less. In particular, the laser equipment L2 is constituted by the laser pumping sections 50$b$, 5$b$ and 5$c$, and because the incident position 100$b$ of the laser beam, as is the incident position 100$b$ in FIG. 16, is selected in such a way that an amplified incident beam having an unvarying beam diameter and beam wavefront curvature can be propagated consistent with a cascade-type constitution even though the pumping energy is varied, an incident beam having unvarying beam diameter beam eam wavefront curvature can be guided and amplified in a wide range of pumping energy for the laser equipment L2. Furthermore, also by independently changing the pumping energy for the laser equipment L1 and L2, L1 and L2 can stably be combined over a wide range of pumping energy. In addition, even when the constitution of the laser active media and laser active medium pumping devices for L1 is different from those for L2, L1 and L2—in each of their operative ranges—can be operatively combined.

Embodiment 7

Figure 18:
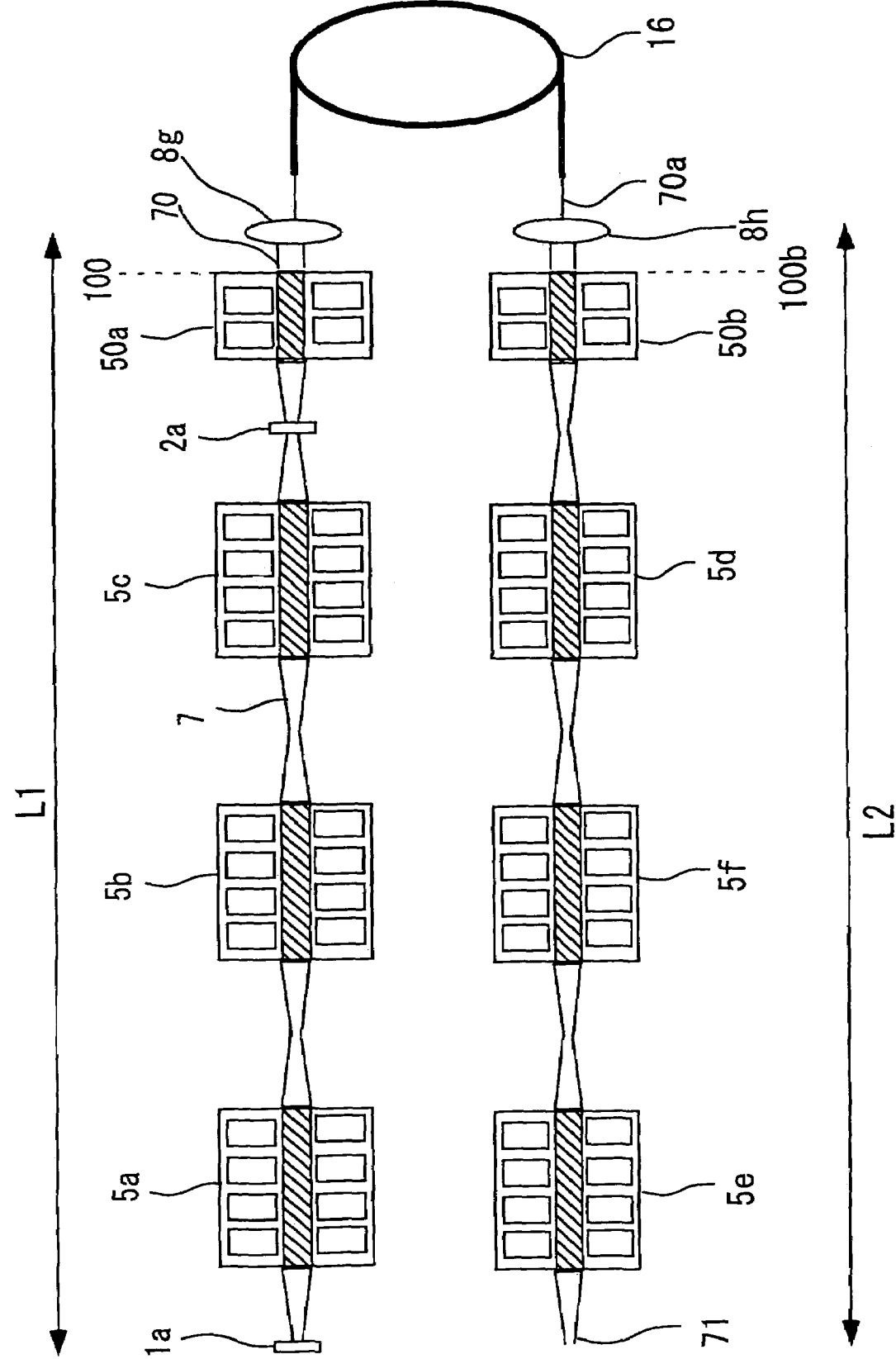
FIG. 18 is a schematic block diagram of laser equipment according to Embodiment 7 of the present invention.

FIG. 18 is a view for explaining laser equipment and its pumping method according to Embodiment 7 of the present invention, and more particularly is a block diagram illustrating the laser equipment. In FIG. 18, 8$g$ and 8$h$ are lenses; 16 is an optical fiber; a laser oscillator is constituted by arranging the laser pumping sections 5$a$, 5$b$ and 5$c$ between the totally reflecting mirror 1$a$ and the partially transmitting mirror 2$a$; 7 is the laser beam generated in the laser oscillator, part of which passes through the partially transmitting mirror 2$a$ and is extracted for the laser amplifier constituted by the laser pumping section 50$a$. The laser oscillator and the laser amplifier described above constitute laser equipment L1. The output laser beam 70 of the laser equipment L1 passes through the lens 8$g$, the optical fiber 16 and the lens 8$h$ in that order and is made to enter the laser amplifier constituted by the laser pumping sections 50$b$, 5$d$, 5$e$ and 5$f$, i.e., laser equipment L2. In this situation, the L1 and L2 are constituted respectively in such a manner that the pumping energy of laser pumping section 50$a$ is half those of the laser pumping sections 5$a$, 5$b$ and 5$c$; the focal length of the thermal-lens formed by the laser active medium of the laser pumping section 50$a$ is double those of the laser active media of the laser pumping sections 5$a$, 5$b$ and 5$c$; the pumping energy of the laser active medium of the laser pumping section 50$b$ is half those of the laser pumping sections 5$d$, 5$e$ and 5$f$; and the focal length of the thermal-lens formed by the laser active medium of the laser pumping section 50$b$ is half those of the laser pumping sections 5$d$, 5$e$ and 5$f$ In other words, the laser equipment L1 that is constituted by the laser pumping sections 5a, 5b, 5c, 50a and the laser equipment L2 that is constituted by the laser pumping sections 50b, 5d, 5e and 5f respectively and separately form configurations that are equal to the end sections of the laser equipment illustrated in FIGS. 1 and 16. The present embodiment is distinguished from Embodiment 6 by the fact that although in Embodiment 6 the output laser beam 70 of the laser equipment L1 passes through the optical elements 8e and 8f and is made to enter the laser equipment L2, in the present embodiment, the output laser beam 70 of the laser equipment L1 passes through the lens 8g, the optical fiber 16 and the lens 8h in that order and is made to enter the laser equipment L2.

The operation of the laser equipment illustrated in FIG. 18 is now described. The laser beam 7 generated in the laser oscillator constituted by the totally reflecting mirror 1a, the partially transmitting mirror 2a and the laser pumping sections 5a, 5b and 5c is outputted as a laser beam 70 after being amplified in the course of passing through the laser amplifier constituted by the laser pumping section 50a. The position illustrated by 100 in FIG. 18 is one where the variation in the beam diameter and beam wavefront curvature is small when the pumping energy changes, as is the case of 100 in FIG. 1. As a result, the variation in the beam diameter and beam wavefront curvature of the output laser beam 70 are small against the change in the pumping energy in the laser equipment L1, as is the output laser beam 70 in FIG. 1. The output beam 70 is condensed by the lens 8g to enter the optical fiber 16. The laser beam 70a extracted from the optical fiber 16 is modified by the lens 8h with regard to its beam curvature and beam diameter so as to join the laser pumping section 50b and turns to an incident beam 70a for the subsequent amplification stage. The incident beam 70a is also one with small variation in the beam diameter and beam wavefront curvature against the change of pumping energy, since the variation in the beam diameter and beam wavefront curvature, against the change of pumping energy in the laser equipment L1, is small. The incident beam 70a enters the laser amplifier constituted by the laser pumping sections 50b, 5d, 5e and 5f (the laser equipment L2) and is amplified thereby to be extracted as an emitted laser beam 71.

The subsequent laser equipment L2 has the same constitution as the laser equipment in FIG. 16. In particular, the laser equipment L2 is constituted by the laser pumping sections 50b, 5d, 5e and 5c, and because the incident position 10b of the laser beam, as is the incident position 100b in FIG. 16, is selected in such a way that the amplified incident beam having an unvarying beam diameter and beam wavefront curvature can be propagated consistent with a cascade-type constitution even though the pumping energy is varied, an incident beam having an unvarying beam diameter and beam wavefront curvature can be guided and amplified in the wide range of pumping energy for the laser equipment L2.

Furthermore, also by independently changing the pumping energy for the laser equipments L1 and L2, L1 and L2 can stably be combined over a wide range of pumping energy. In addition, even when the constitution of the laser active media and the laser active medium pumping devices for L1 is different from that of those for L2, L1 and L2—in each of their operative ranges—can be operatively combined. Moreover, damage resulting from excessively condensed beams on the end face of the optical fiber 16 can be averted. Furthermore, in FIG. 18, although all the optical systems on the emitting side of the optical fiber 16 are constituted by amplifiers, a laser oscillator containing the optical fiber 16 can also be constituted by arranging a partially transmitting mirror after any one of the laser pumping sections 50b, 5d, 5e, and 5f. Moreover, a constitution which has small variation in curvature and diameter of the emitted beam may be implemented by making the laser pumping section 5e of the endmost emitting end equivalent to the pumping sections 50a and 50b.

Embodiment 8

Figure 19:
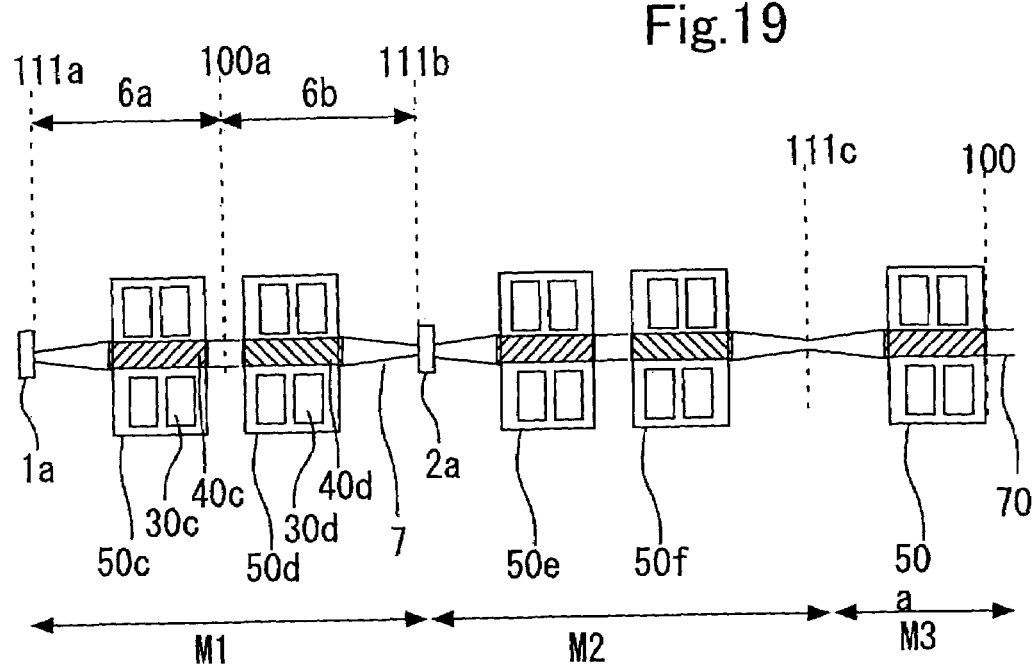
FIG. 19 is a schematic block diagram of laser equipment according to Embodiment 8 of the present invention.

FIG. 19 is a view for explaining laser equipment and its pumping method according to Embodiment 8 of the present invention, and more particularly is a block diagram illustrating the laser equipment. In Embodiment 8, the laser pumping sections 50c, 50d, 50e, 50f and 50a are all constituted in the same way as is 50a in FIG. 1; and the laser pumping sections 50c and 50d are arranged between the totally reflecting mirror 1a and the partially transmitting mirror 2a to constitute a laser oscillator M1. In this situation, no position where the sign of beam wavefront curvature changes—i.e., a beam waist—exists between the laser pumping sections 50c and 50d. Moreover, a beam-waist position on the end face of the totally reflecting mirror 1a is represented by 111a; a beam-waist position on the end face of the partially transmitting mirror 2a is represented by 111b; and a mid-position between the beam-waist positions 111a and 11d is represented by 100a. Optical systems 6a and 6b are arranged respectively between the positions 111a and 100a, and between the positions 100a and 111b along the laser beam axis; and the optical systems 6a and 6b are constituted symmetrical to each other with respect to the position 100a. In addition, laser pumping sections 50e and 50f, which are arranged in pairs in a stage following the laser oscillator M1, constitute a laser amplifier M2; the laser pumping section 50a, which is arranged following the laser amplifier M2, constitutes a laser amplifier M3; and in consequence, the optical systems as a whole are constituted recurring in the order 6a, 6b, 6a, 6b and 6a along the laser beam axis.

In FIG. 19, the position 100a is a position equivalent to 100a in FIG. 1, where the variation in beam diameter and in beam wavefront curvature, which is dependent on the pumping energy of the laser pumping section, is small. Moreover, 111c is a reference mark indicating a beam-waist position between the laser pumping sections 50f and 50a; the pumping energy of the laser pumping section 50a, which is situated in a stage following the position 111c, is half of the total pumping energy—as is the laser pumping section 50a in FIG. 1—of the laser pumping sections 50c and 50d which are situated between adjacent beam waists, or between positions where the signs of beam wavefront curvatures change, i.e., between the positions 111a and 111b; in consequence, the laser equipment is constituted in such a way that the pumping energy-dependent variation in the beam diameter and in the beam wavefront curvature in the beam-extraction position 100 is small.

As described above, laser equipment may be constituted by dividing an pumping section equivalent to a single pumping section, such as 5a illustrated FIG. 1, etc. In addition, in FIG. 19, a case where laser pumping sections, especially laser active media, between beam waists in laser equipment are divided into two portions is illustrated, but laser equipment may also be constituted by further dividing the laser pumping sections 50c, 50d, 50e, 50f, 50a into two or more portions, and in such a way that the total pumping energy of the laser active media located between adjacent beam waists is equivalent to the case of FIG. 19. Moreover, in the present embodiment, a configuration where planar mirrors are utilized, but no lens is included is illustrated, but laser equipment may also be constituted by mirrors with curvature, and lenses, as is Embodiment 4.

Embodiment 9

Figure 20:
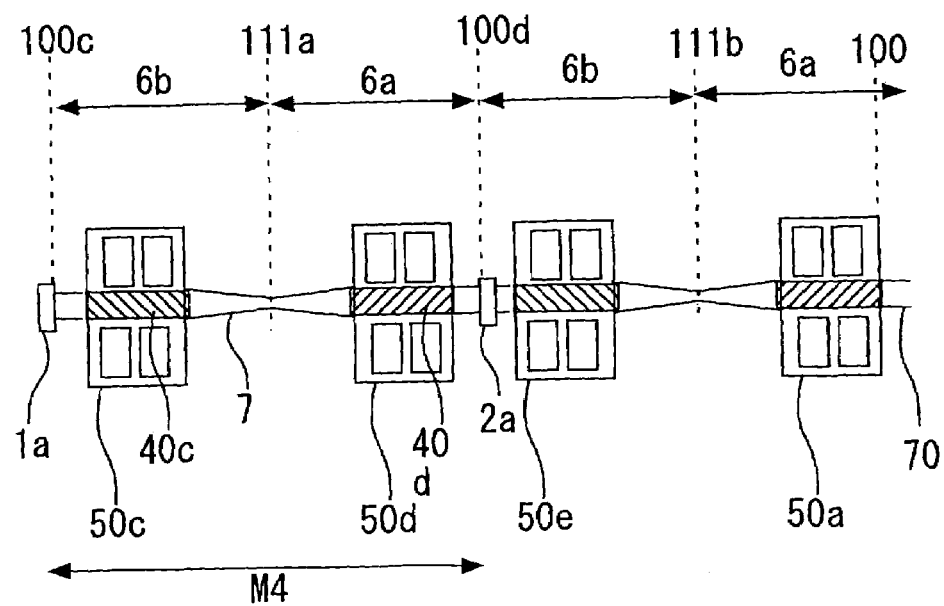
FIG. 20 is a schematic block diagram of laser equipment according to Embodiment 9 of the present invention.

FIG. 20 is a view for explaining laser equipment and its pumping method according to Embodiment 9 of the present invention, and more particularly is a block diagram illustrating the laser equipment. In Embodiment 9, as is the case in Embodiment 8, the laser pumping section 50c, 50d, 50e, 50a and 50a are all constituted in the same way as is 50a in FIG. 1, and a laser oscillator M4 is constituted by arranging the laser pumping sections 50c and 50d between the totally reflecting mirror 1a with plane curvature and the partially transmitting mirror 2a with plane curvature. A laser beam emitted from the laser oscillator M4 is made to enter an amplifier constituted by the laser pumping section 50e, passes through the optical system 6b as the amplifier portion, forms a beam waist in the position 111b, is made to enter the amplifier constituted by the laser pumping section 50a, and after being amplified is emitted as the laser beam 70.

In this case, the optical arrangement in the laser resonator differs from that illustrated in Embodiment 8, i.e., FIG. 19. A beam waist is situated in the position 111a, which is an intermediate position between the laser pumping section 50c and 50d; and the positions 100c and 10d, which are respectively on the end faces of the totally reflecting mirror 1a and the partial reflective mirror 2a, and the beam-extraction position 100 are positions where the beam wave surface is planar and the beam diameter is maximal. That is to say, 100c, 10d and 100 are positions corresponding to 100a and 100b in FIG. 19, and 11a and 111b in FIG. 20 are positions corresponding to 111a, 111b and 111c in FIG. 19. Accordingly, pumping energy-dependent variation in the laser-beam wavefront curvature and beam diameter of the beam emitted from the laser oscillator M4 and the laser beam extracted from the emitting portion 100 of the laser amplifier is small.

In addition, in Embodiment 9 also, the pumping energy of the laser pumping section 50a, which is in the beam-extraction-position end, is half of the sum of the pumping energy of the laser pumping sections 50d and 50e, which are situated between adjacent beam waists-between 111a and 111b.

According to Embodiment 9, laser equipment with mirrors arranged in the vicinity of the laser active media can be constituted. Moreover, the laser active media 40c and 40d can function respectively as a totally reflecting mirror and as a partially transmitting mirror when they are coated on their end faces. Moreover, in the laser equipment constituted as in FIG. 20, since the laser beam diameter in the mirror positions is set larger than that in any other position in the oscillator, damage to the mirrors caused by the laser beam can be averted. For that reason, in the case where a Q-pulse beam or the like is generated, the effect of the present invention can more largely be demonstrated utilizing a higher-output-power laser beam. Although not illustrated in FIG. 20, other optical elements such as lenses may be arranged inside the laser equipment. Furthermore, although FIG. 20 illustrates the case where planar mirrors are employed, mirrors with curvature may also be used as in Embodiment 2.

Embodiment 10

Figure 21:
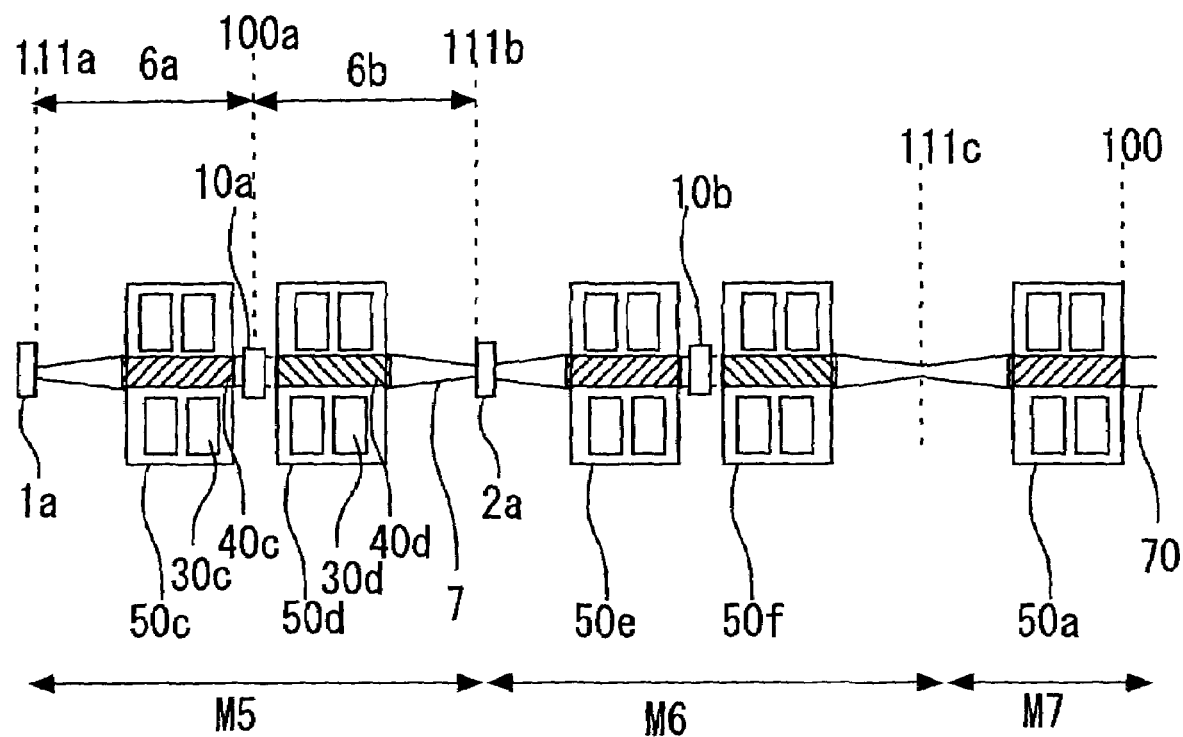
FIG. 21 is a schematic block diagram of laser equipment according to Embodiment 10 of the present invention.

FIG. 21 is a view for explaining laser equipment and its pumping method according to Embodiment 10 of the present invention, and more particularly is a block diagram illustrating the laser equipment. A laser oscillator M5 is constituted by arranging the laser pumping sections 50c and 50d between the totally reflecting mirror 1a and the partially transmitting mirror 2a; the laser pumping sections 50e and 50f, which are arranged in pairs in a stage following the laser oscillator M5, constitute a laser amplifier M6; the laser pumping section 50a, which is arranged in a stage following the laser amplifier M6, constitutes a laser amplifier M7; in consequence, the optical systems as a whole are constituted recurring in the order 6a, 6b, 6a, 6b and 6a along the laser beam axis. As set forth above, the arrangement and constitution for the laser oscillator, the laser pumping sections, and the mirrors are approximately the same as those in FIG. 19; in Embodiment 10, 90-degree polarization-direction rotators 10a and 10b are arranged respectively between the laser pumping sections 50c and 50d, and between the laser pumping sections 50e and 50f.

In laser equipment constituted as that in FIG. 21, since the laser oscillator is constituted as a doublet-lens eliminating configuration which includes the 90-degree polarization-direction rotators, in the laser resonator, the radially directed r-polarization beam is identical to the circumferentially directed Φ-polarization beam over a wide range of pumping energy and a wide range of positions along the beam axis inside the optical systems. In other words, since the r-polarization beam and the Φ-polarization beam coincide with each other in the charts for the beam diameter and beam wavefront curvature represented in FIGS. 2 through 7, and stable oscillation can be carried out over a wide range of pumping energy, the effect of the present invention can more largely be demonstrated. Moreover, in constitutions advantageous to linear-polarization-oscillation operation, a constitution in which variation dependency on pumping energy is slight can be implemented. In addition, in the constitution as that in FIG. 21 in which 90-degree polarization-direction rotators are arranged, since the laser beam is extracted from the position where the differences in the beam diameter and beam wavefront curvature between the radial-direction r-polarization beam and the circumferential-direction Φ-polarization beam in the beam-extraction position are small, utilization of the output beam is facilitated.

Embodiment 11

Figure 22:
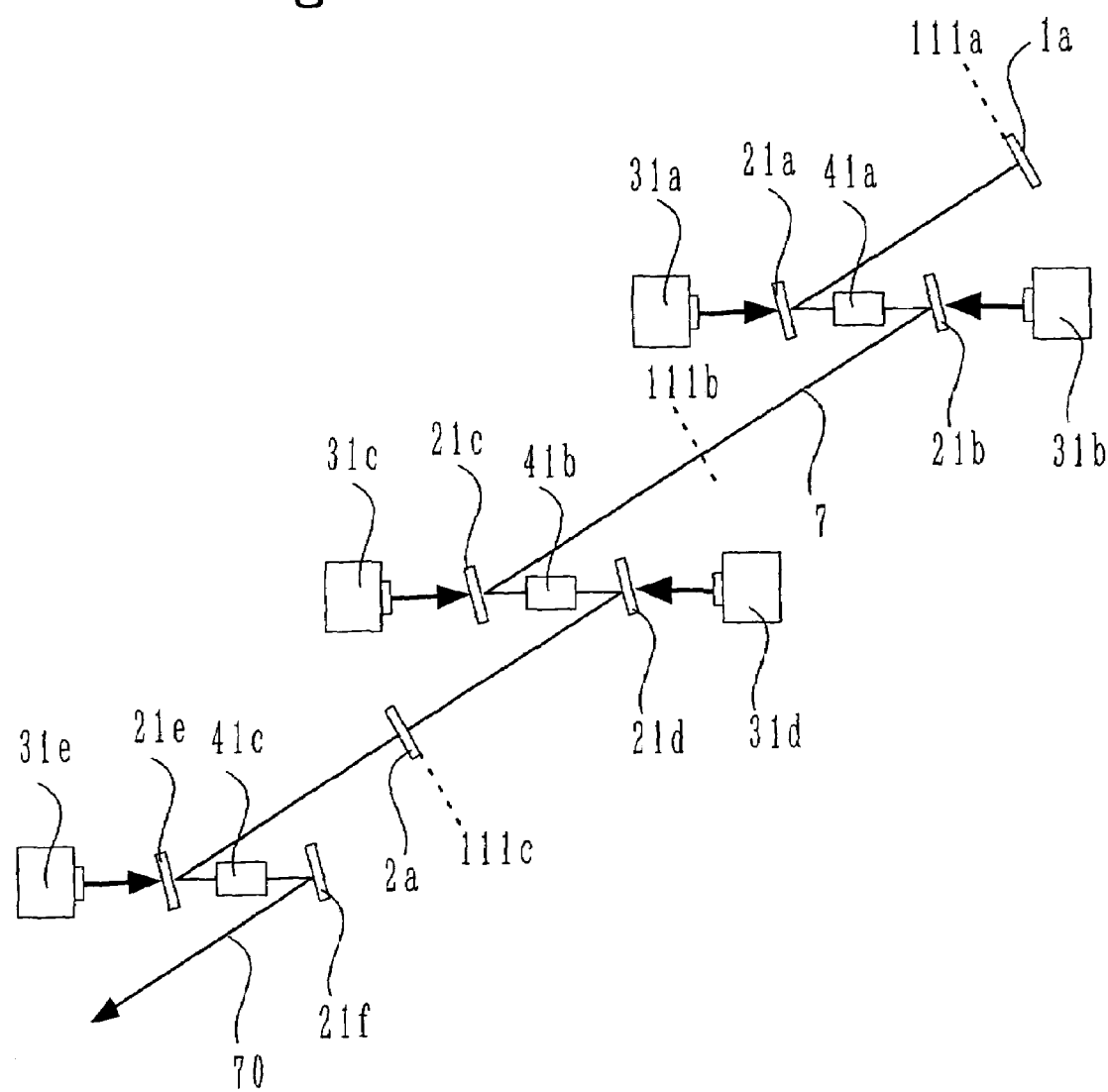
FIG. 22 is a schematic block diagram of laser equipment according to embodiment 11 of the present invention.

FIG. 22 is a view for explaining laser equipment and its pumping method according to Embodiment 11 of the present invention, and more particularly is a block diagram illustrating the laser equipment. In FIG. 22, 1a is the totally reflecting mirror with plane curvature, 2a is the partially transmitting mirror with plane curvature. 31a, 31b, 31c, 31d and 31e are laser active medium pumping devices, and a case where the pumping devices are LDs (laser diodes) is described below. 41a, 41b and 41c are rod-type solid-state laser active media made of Nd:YAG, and the laser active medium pumping devices 31a, 31b, 31c, 31d and 31e are arranged so as to excite the solid-state laser active media 41a, 41b, and 41c through their end faces. 21a, 21b, 21c, 21d, 21e and 21f are laser-beam return mirrors coated in such a way that they totally transmit the laser beams respectively from the LDs 31a, 31b, 31c, 31d, and 31e, and that they totally reflect the laser beam from the solid-state laser active media. 7 is the laser beam inside a resonator, and 70 is the emitted laser beam.

The constitution of the laser equipment according to Embodiment 11 is now described in detail. In FIG. 22, both of the end faces of the solid-state laser active media 41a and 41b, which constitute an oscillator, are excited by pumping beams which are emitted from the laser active medium pumping devices 31a, 31b, 31c and 31d and pass through the laser-beam return mirrors 21a, 21b, 21c and 21d. On the other hand, only the end face of the solid-state laser active medium 41c, which constitutes a laser amplifier, opposite its emitting side is excited, by the laser active medium pumping device 31e. The laser active media pumping devices 31a, 31b, 31c, 31d and 31e are designed and constituted, by adjusting beam-incident conditions and LD-beam absorptance respectively for the solid-state laser active media 41a, 41b and 41c, in such a way that absorption-power losses from the pumping LD power into the solid-state laser active media 41a, 41b and 41c are equal. The solid-state laser active media 41a, 41b and 41c are designed in such a manner that they have equal specifications such as size, shape and Nd-atom doping concentration, and have equal thermal lenses and aberrations, and that they form cascade-type laser equipment wherein the beam shape is periodic from the totally reflecting mirror 1a to the partially transmitting mirror 2a.

In other words, the optical path length from the totally reflecting mirror 1a to the end face of the solid-state laser active medium 41a, and the optical path length from the partially transmitting mirror 2a to the end face of the solid-state laser active medium 41b, are each half of the optical path length from the end face of the solid-state laser active medium 41a to the end face of the solid-state laser active medium 41b. On the other hand, the solid-state laser active medium 41c is constituted in such a manner that the length from the end face of the solid-state laser active medium 41c to the end face of the partially transmitting mirror 2a is equal to the length from the end face of the solid-state laser active medium 41b to the end face of the partially transmitting mirror 2a.

In addition in FIG. 22, 111a is the reference mark indicating beam-waist position in the end face of the totally reflecting mirror 1a; 111b is the reference mark indicating beam-waist position between the solid-state laser active media 41a and 41b; and 111c is the reference mark indicating beam-waist position in the position of the partially transmitting mirror 2a. The solid-state laser active media 41a, 41b and 41c are constituted in such a way that the pumping energy of the laser active medium 41c situated beyond the beam waist 111c, which is in the endmost position out of the beam waists, is half, and the focal length of the generated thermal lens is double, in comparison with the laser active medium 41b situated between the adjacent beam waists 111c and 111b as well as the laser active medium 41a situated between the adjacent beam waists 111b and 111a . . . in other words, in such a manner that the point whereat the periodic-propagation beam mode, which is formed in the constitution including the laser oscillator and laser amplifier, is collimated is the beam-extraction port.

The operation of laser equipment according to the present embodiment is set forth below. The laser oscillator constituted from the totally reflecting mirror 1a, the solid-state laser active media 41a and 41b, and the partially transmitting mirror 2a, with both end faces of the solid-state laser active media 41a and 41b being excited by the laser active medium pumping devices 31a, 31b, 31c and 31d, generates a resonator internal laser beam 7. The solid-state laser active medium 41c arranged on the beam axis functions as a laser amplifier by being excited by the laser active medium pumping device 31e. The laser beam 7 is extracted through the partially transmitting mirror 2a to the outside of the resonator and amplified while passing through the solid-state laser active medium 41c, and then is extracted as the laser beam 70 to the outside of the laser oscillator and the laser amplifier.

In the laser oscillator and the laser amplifier constituted in this manner, since the emitting-side end face of the solid-state laser active medium 41c is not excited, the thermal-lens focal length of the solid-state laser active medium 41c is longer than those of the other laser active media 41a and 41b, and the variation, depending on the pumping intensity, in the beam diameter and in the beam curvature of the laser equipment can be diminished. Moreover, when the pumping power absorbed from the laser active medium pumping device 31e by the solid-state laser active medium, and the pumping power absorbed from the laser active medium pumping devices 31a, 31b, 31c and 31d by the solid-state laser active media, are identical, the present invention demonstrates its greatest effect. In that case, since the beam is extracted from the collimating point, which is not dependent on the pumping intensity, in the periodic beam propagation, a beam that is approximately collimated can be extracted without being dependent on the pumping intensity.

As described heretofore, in each of Embodiments 1 through 11, a plurality of laser pumping sections is arranged in a cascade and constituted in such a manner that beam waists are periodically generated by the thermal lenses of the laser active media, and the incident end or the emitting end is situated in the position where the beam diameter of the laser beam is maximal, by setting the pumping energy of the laser pumping section that is arranged beyond the beam waist situated in the endmost incident or emitting position to half of the sum of the pumping energy of the pumping sections located between adjacent beam waists. As a result, laser equipment can be provided that can obtain an output beam with small pumping energy-dependent variation in the beam diameter and in the beam wavefront curvature; or an amplifier can be provided that can propagate an incident beam that remains identical over a wide range of pumping energy without deforming the cascade-type beam mode.

Embodiment 12

Figure 23:
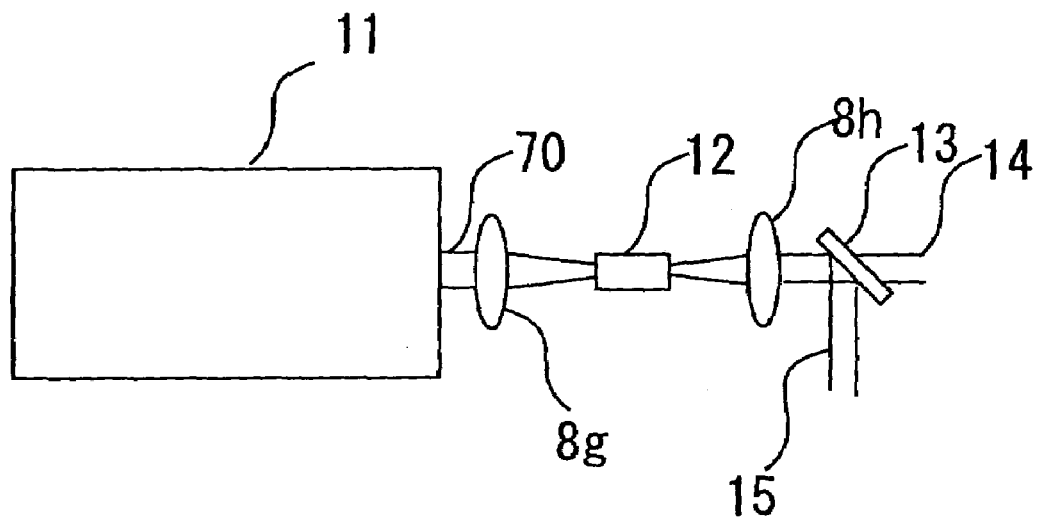
FIG. 23 is a schematic block diagram of laser equipment according to embodiment 12 of the present invention.

FIG. 23 is a view illustrating laser equipment according to Embodiment 12 of the present invention. In FIG. 23, 11 is laser equipment constituted so that pumping energy-dependent variation in wavefront curvature and in beam diameter is small, i.e., 11 is any one of the laser devices described in Embodiments 1 through 11; 70 is the laser beam generated in the laser equipment 11; 8g and 8h are lenses; 12 is a wavelength-conversion element that includes means, such as a temperature-adjusting device and an angle-adjusting device, for implementing phase matching; 13 is a laser-beam splitter mirror that has high transmittance for a wavelength-converted laser beam and high reflectance for a fundamental-wave laser beam; 14 is the wavelength-converted laser beam; 15 is the fundamental-wave laser beam, the wavelength of which is not converted in the course of passing through the wavelength-conversion device. In laser equipment constituted as that in FIG. 23, the beam 70 generated in the laser equipment 11 according to the present invention is condensed in the wavelength-conversion device 12 by the lens 8g and partially converted in wavelength. Both the wavelength-converted laser beam and the fundamental-wave beam are collimated by lens 8h, and then are split by the laser-beam splitter mirror 13 into the wavelength-converted laser beam 14 and the fundamental-wave laser beam 15.

In the laser equipment constituted in the foregoing way, since laser equipment according to the present invention described in any one of Embodiments 1 through 11 is utilized as a fundamental-wave beam source, pumping energy-dependent variation in beam diameter and in wavefront curvature of the emitted beam from the laser beam source 11 is slight. Accordingly, laser equipment having high conversion efficiency over a wide range of pumping energy, i.e., a wide range of output power, can be provided. Moreover, since the beam wavefront curvature and beam diameter of the wavelength-converted laser beam vary depending on variation in the beam wavefront curvature and beam diameter of the fundamental-wave beam in the position of the wavelength-conversion active medium, a beam source for a wavelength-converted laser beam can be provided, wherein variation in the beam diameter and beam wavefront curvature of the wavelength-converted laser beam with respect to change in pumping energy of the laser equipment 11 is slight.

In addition, in the present embodiment, although the constitution is implemented in such a manner that a desired wavelength-converted laser beam is generated through a single wavelength-conversion stage, as may be necessary, the wavelength conversion may be carried out with two or more types of wavelength-conversion devices, or two or more devices configured on the beam path.

Embodiment 13

Figure 24:
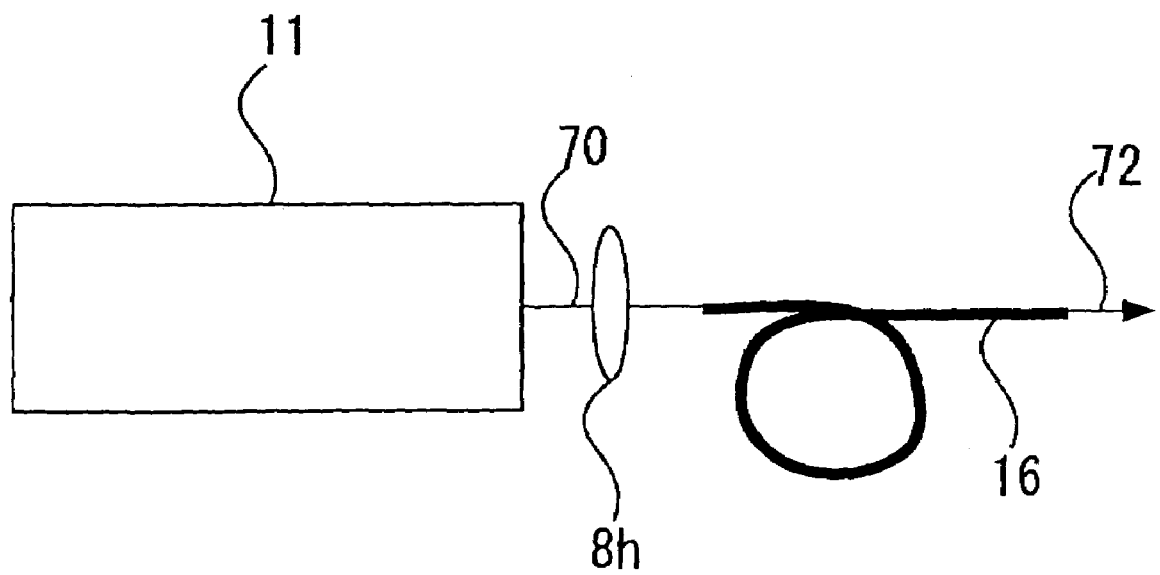
FIG. 24 is a schematic block diagram of laser equipment according to embodiment 13 of the present invention.

FIG. 24 is a view illustrating laser equipment according to Embodiment 13 of the present invention. In FIG. 24, 11 is the laser equipment constituted so that the variation in emitted-beam parameters is small, i.e., any one of the laser devices described in Embodiments 1 through 11; 70 is the laser beam originating in the laser equipment 11; 16 is an optical fiber; 72 is an emitted beam from the optical fiber 16; 8h is the condensing lens.

The operation of the laser equipment illustrated in FIG. 24 is now described. The laser beam 70 originating in the laser beam source 11 is condensed by the condensing lens 8h, guided into the optical fiber 16 and extracted as the output beam 72. In the laser equipment illustrated in FIG. 24, since a laser beam with small variation in beam wavefront curvature and in beam diameter over a wide range of pumping energy is guided into the optical fiber, an optical-fiber-guided beam in which variation in optical guiding conditions is slight is possible; thus, design and arrangement of an optical guiding system are facilitated.

Embodiment 14

Figure 25:
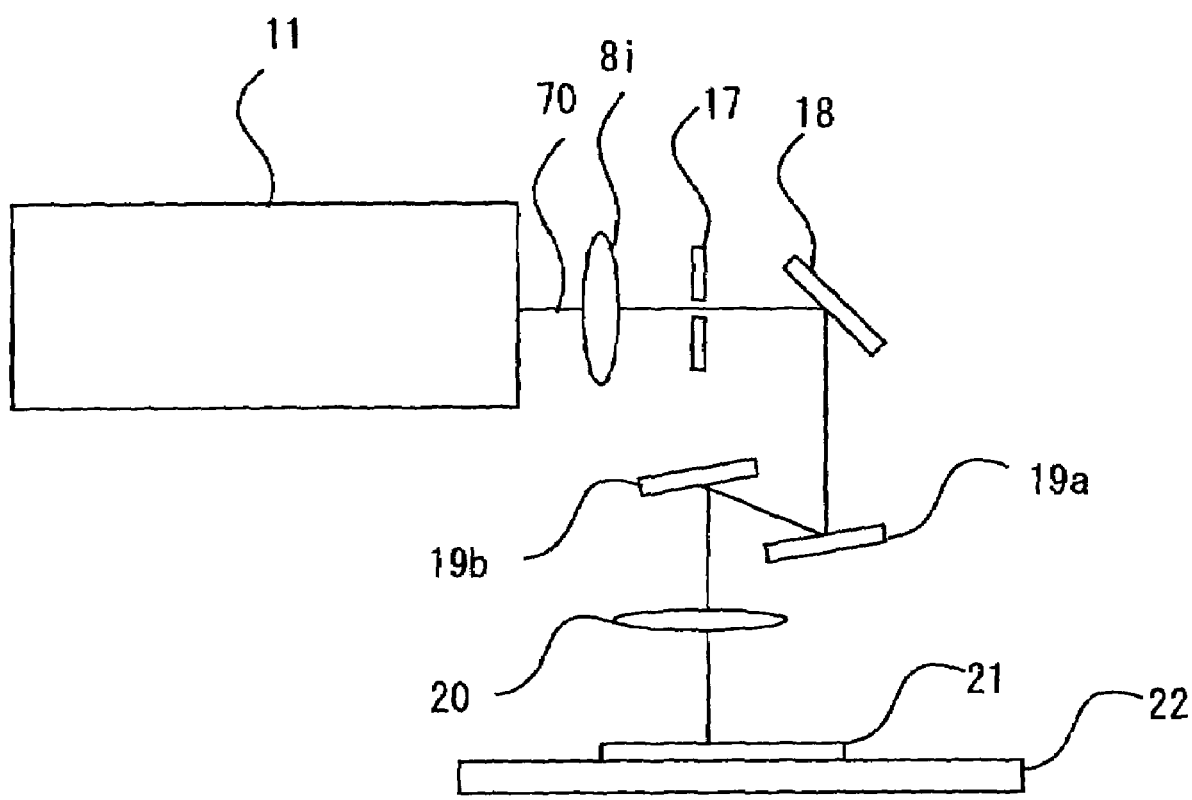
FIG. 25 is a schematic block diagram of laser equipment according to embodiment 14 of the present invention.

FIG. 25 is a block diagram illustrating a laser machining apparatus, according to Embodiment 14 of the present invention. In FIG. 25, 11 is the laser equipment constituted so that the pumping energy-dependent variation in emitted-beam parameters is small, i.e., any one of the laser devices described in Embodiments 1 through 11; 70 is the emitted laser beam originating in the laser equipment 11; 8i is a condensing lens; 17 is an aperture; 18 is a laser-beam return mirror; 19a and 19b are galvanometer mirrors; 20 is a processing lens; 21 is an object to be processed, which is mounted on a stage 22 that can rapidly shift the object to be processed 21.

In a laser machining device constituted as that in FIG. 25, since pumping energy-dependent variation in the beam wavefront curvature and in the beam diameter of the laser beam 70 originating in the laser equipment 11 is small, a laser machining device can be provided, wherein variation in the laser-beam parameters over a wide range of pumping energy for, i.e., over a wide range of output power from, the laser equipment 11 is small. In addition, as in the present embodiment, when devices such as an aperture, a homogenizer and an aspheric lens, which implement laser-beam modulation that depends on position cross-sectionally within the beam, are arranged on the beam axis, the effects of the present invention can be significantly demonstrated.

INDUSTRIAL APPLICABILITY

Laser equipment according to the present invention can be utilized, for example, as a laser machining device, and since such a laser machining device can perform very precise, consistent work with long-term stability, it can advantageously be used, e.g., in various processes such as manufacturing printed circuit boards and fiber gratings. Moreover, in the laser equipment according to the present invention, since pumping intensity-dependent variation in output-beam diameter is small, the effects are largely demonstrated especially in the application in which a laser beam is utilized in a condensed state; for example, welding-purpose lasers or cutting-purpose lasers that utilize optical-fiber beam guidance associated with beam condensation, or wavelength-converted lasers associated with beam condensation. In these applications, since stable processing characteristics can be obtained without depending on the pumping intensity, the operation is easy, and inconsistencies in characteristics caused by inconsistencies in components used in identical tool types can be suppressed.

What is claimed is:

1. A method of exciting laser equipment that includes a plurality of doped laser active media in the form of rods and having the same dopant concentration, each laser active medium generating a lens effect in response to excitation, the plurality of laser active media being arranged in series in a region along a beam axis of the laser equipment and forming a plurality of beam waists in a laser beam within the region, the method comprising:

applying a first pumping energy to a fast of the laser active media, the first of the laser active media being disposed beyond at least one of the beam waists, at an end of the region, and applying a second pumping energy to a second of the laser active media, the second of the laser active media being disposed between two adjacent beam waists, wherein the first pumping energy is approximately one-half the second pumping energy, the first and second of the laser active media have respective first and second excitation portions having respective first and second excitation lengths, and the first excitation length is one-half the second excitation length; and the first and second of the laser active media have equal diameters.

2. A method of exciting laser equipment including a plurality of laser active media, each laser active medium generating a lens effect in response to excitation, the plurality of laser active media being arranged in series in a region along a beam axis of the laser equipment and forming a plurality of beam waists in a laser beam within the region, the method comprising:

applying a first pumping energy to a first of the laser active media, the first of the laser active media being disposed beyond at least one of the beam waists, at an end of the region, and applying a second pumping energy to a second of the laser active media, the second of the laser active media being disposed between two adjacent beam waists, wherein the second pumping energy is larger than the first pumping energy, both of the first and second of the laser active media have end faces and are configured for being excited on their end faces, the first of the laser active media is pumped though only one end face, and the second of the laser active media is pumped though both end faces.

3. A method of exciting laser equipment including a plurality of laser active media, each laser active medium generating a lens effect in response to excitation, the plurality of laser active media being arranged in series in a region along a beam axis of the laser equipment and forming a plurality of beam waists in a laser beam within the region, the method comprising:

applying a first pumping energy to a first of the laser active media, the first of the laser active media being disposed beyond at least one of the beam waists, at an end of the region, to produce a first thermal-lens focal length, and applying a second pumping energy to a second of the laser active media, the second of the laser active media being disposed between two adjacent beam waists, to produce a second thermal-lens focal length, wherein the first thermal-lens focal length is approximately twice as long as the second thennal-lens focal length.

4. A method of exciting laser equipment that includes a plurality of doped laser active media in the form of rods and having the same dopant concentration, each laser active medium generating a lens effect in response to excitation, the plurality of laser active media being arranged in series in a region along a beam axis of the laser equipment and forming a single beam waist in a laser beam within the region, the method comprising:

applying a first pumping energy to a first of the laser active media, the first of the laser active media being disposed flanking the beam waist on a first side, applying a second pumping energy to a second of the laser active media, the second of the laser active media being disposed flanking the beam waist on a second side, wherein the first pumping energy is approximately one-half of the second pumping energy, the first and second of the laser active media include respective first and second excitation portions having respective first and second excitation lengths, and the first excitation length is one-half of the second excitation length, and the first and second of the laser active media have equal diameters.

5. A method of exciting laser equipment that includes a plurality of doped laser active media in the form of rods and having the same dopant concentration, each laser active medium generating a lens effect in response to excitation, the plurality of laser active media being arranged in series in a region along a beam axis of the laser equipment and forming a plurality of beam waists in a laser beam within the region, the method comprising:

applying a first pumping energy to a first of the laser active media, the first of the laser active media being disposed beyond at least one of the beam waists, at an end of the region, and applying a second pumping energy to a second of the laser active media, the second of the laser active media being disposed between two adjacent beam waists, wherein the first pumping energy is approximately one-half the second pumping energy, the first and second of the laser active media have respective first and second excitation portions having respective first and second excitation lengths, and the first excitation length equals the second excitation length; and the first and second of the laser active media have equal diameters.

6. A method of exciting laser equipment that includes a plurality of doped laser active media in the form of rods and having the same dopant concentration, each laser active medium generating a lens effect in response to excitation, the plurality of laser active media being arranged in series in a region along a beam axis of the laser equipment and forming a single beam waist in a laser beam within the region, the method comprising:

applying a first pumping energy to a first of the laser active media, the first of the laser active media being disposed flanking the beam waist on a first side, applying a second pumping energy to a second of the laser active media, the second of the laser active media being disposed flanking the beam waist on a second side, wherein the first pumping energy is approximately one-half of the second pumping energy, the first and second of the laser active media include respective first and second excitation portions having respective first and second excitation lengths, and the first and second excitation lengths are the same, and the first and second of the laser active media have equal diameters.

* * * * *